US009218703B2

(12) United States Patent
Insolia et al.

(10) Patent No.: US 9,218,703 B2
(45) Date of Patent: Dec. 22, 2015

(54) VIRTUAL VENDING MACHINE IN COMMUNICATION WITH A REMOTE DATA PROCESSING DEVICE

(75) Inventors: Gerard E. Insolia, Atlanta, GA (US); Leonard F. Antao, Roswell, GA (US); David O. Slagley, Roswell, GA (US); H. Brock Kolls, Aplharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 1120 days.

(21) Appl. No.: 12/135,308

(22) Filed: Jun. 9, 2008

(65) Prior Publication Data

US 2009/0306819 A1 Dec. 10, 2009

(51) Int. Cl.

| | |
|---|---|
| ***G06F 17/00*** | (2006.01) |
| ***G07F 9/02*** | (2006.01) |
| ***G07F 11/00*** | (2006.01) |

(52) U.S. Cl.

CPC ................ *G07F 9/02* (2013.01); *G07F 11/002* (2013.01)

(58) Field of Classification Search

CPC ................................ G07F 9/02; G07F 11/002
USPC ................................................ 700/231–232
See application file for complete search history.

(56) References Cited

U.S. PATENT DOCUMENTS

| | | | | |
|---|---|---|---|---|
| RE29,450 | E | 10/1977 | Goldsby et al. | |
| 4,412,292 | A | 10/1983 | Sedam et al. | |
| 4,417,450 | A | 11/1983 | Morgan, Jr. et al. | |
| 4,853,684 | A * | 8/1989 | Hoppstadter | 340/5.9 |
| 5,091,713 | A | 2/1992 | Horne et al. | |
| 5,592,377 | A * | 1/1997 | Lipkin | 705/42 |
| 5,608,643 | A * | 3/1997 | Wichter et al. | 700/244 |
| 5,963,452 | A * | 10/1999 | Etoh et al. | 700/236 |
| 6,056,194 | A * | 5/2000 | Kolls | 235/381 |
| 6,181,981 | B1 | 1/2001 | Varga et al. | |
| 6,243,626 | B1 * | 6/2001 | Schanin | 700/286 |
| 6,321,985 | B1 * | 11/2001 | Kolls | 235/381 |
| 6,389,822 | B1 * | 5/2002 | Schanin | 62/89 |
| 6,536,626 | B2 | 3/2003 | Newman et al. | |
| 6,550,641 | B2 | 4/2003 | Newman et al. | |
| 6,584,309 | B1 * | 6/2003 | Whigham | 455/414.1 |
| 6,745,581 | B2 | 6/2004 | King et al. | |
| 6,751,525 | B1 | 6/2004 | Crisp, III | |

(Continued)

FOREIGN PATENT DOCUMENTS

| | | |
|---|---|---|
| JP | 2003/192096 | 7/2003 |
| WO | 2004/107938 | 12/2004 |
| WO | 02/057178 | 8/2005 |

OTHER PUBLICATIONS

Simmons, et al., Title: "Virtual Vendor Shelf Inventory Management", Notice of Allowance & Fee(s) Due, U.S. Appl. No. 12/135,322, dated Dec. 9, 2011, pp. 1-7.

(Continued)

*Primary Examiner* — Michael K Collins

(74) *Attorney, Agent, or Firm* — Sutherland Asbill & Brennan LLP

(57) ABSTRACT

A vending machine system for dispensing goods or services. The vending machine system may include a vending machine with a vending mechanism, a data processing device remote from the vending machine, and a vending bridge. The vending bridge is in communication with the data processing device and the vending mechanism of the vending machine so as to instruct the vending mechanism to dispense the goods or the services.

31 Claims, 17 Drawing Sheets

(56) References Cited

U.S. PATENT DOCUMENTS

| | | | | |
|---|---|---|---|---|
| 6,807,460 | B2 | 10/2004 | Black et al. | |
| 6,810,234 | B1 * | 10/2004 | Rasanen et al. | 455/41.2 |
| 6,931,869 | B2 * | 8/2005 | Schanin | 62/180 |
| 6,959,230 | B1 | 10/2005 | Leibu et al. | |
| 7,079,922 | B2 * | 7/2006 | Komai | 700/237 |
| 7,167,892 | B2 * | 1/2007 | Defosse et al. | 709/200 |
| 7,203,572 | B2 | 4/2007 | Crisp, III | |
| 7,268,698 | B2 | 9/2007 | Hart et al. | |
| 7,739,181 | B2 * | 6/2010 | Breitenbach et al. | 705/37 |
| 7,783,379 | B2 * | 8/2010 | Beane et al. | 700/237 |
| 7,783,380 | B2 * | 8/2010 | York et al. | 700/240 |
| 7,783,389 | B2 * | 8/2010 | Yamada et al. | 700/286 |
| 7,822,503 | B2 * | 10/2010 | Merwarth et al. | 700/236 |
| 8,090,454 | B1 * | 1/2012 | Breitenbach et al. | 700/29 |
| 8,103,380 | B2 * | 1/2012 | Cheng et al. | 700/244 |
| 8,140,185 | B2 * | 3/2012 | Simmons et al. | 700/241 |
| 2002/0130136 | A1 | 9/2002 | Segal | |
| 2004/0073334 | A1 | 4/2004 | Terranova | |
| 2005/0155060 | A1 * | 7/2005 | Sato et al. | 725/42 |
| 2006/0037969 | A1 | 2/2006 | Jennings et al. | |
| 2006/0113322 | A1 | 6/2006 | Maser et al. | |
| 2006/0289553 | A1 * | 12/2006 | Ehlers et al. | 221/9 |
| 2007/0050083 | A1 * | 3/2007 | Signorelli et al. | 700/241 |
| 2007/0296608 | A1 * | 12/2007 | Hart et al. | 340/870.11 |
| 2008/0004973 | A1 | 1/2008 | Rothschild | |
| 2008/0202889 | A1 * | 8/2008 | Breitenbach et al. | 194/217 |
| 2008/0269947 | A1 * | 10/2008 | Beane et al. | 700/237 |
| 2009/0276088 | A1 * | 11/2009 | Ruddy | 700/232 |
| 2009/0306818 | A1 * | 12/2009 | Slagley et al. | 700/232 |
| 2009/0306819 | A1 * | 12/2009 | Insolia et al. | 700/232 |
| 2010/0275267 | A1 * | 10/2010 | Walker et al. | 726/26 |

OTHER PUBLICATIONS

Simmons, et al., Title: "Virtual Vendor Shelf Inventory Management", Response to Final Office Action, U.S. Appl. No. 12/135,322, dated Sep. 15, 2011, pp. 1-10.

* cited by examiner

3000

6000

9000

11000

VIRTUAL VENDING MACHINE IN COMMUNICATION WITH A REMOTE DATA PROCESSING DEVICE

TECHNICAL FIELD

The present application relates generally to vending machines or other types of product dispensers and more particularly relates to vending machines or other types of product dispensers with virtual operating modules in communication via a vending bridge.

BACKGROUND OF THE INVENTION

Generally described, known immediate consumption equipment, such as vending machines, coolers, fountain dispensers, and the like, was designed to operate autonomously. In this regard, all of the hardware systems and electronics as well as the necessary software generally were packaged into the cabinet of the equipment.

Though card readers, online monitoring hardware, and other devices equipped with communication means, such a radio modem or Internet connections, a vending machine or other device may communicate historical inventory information and other types of historical system information. Such devices and external communications, however, generally do not provide operational command and control type functionality from a central facility.

Currently, vending machines and other devices may use an onboard local control system called a vending machine controller. The vending machine controller may be configured to accept consumer payment, provide product selection, and dispense products. Because only autonomous local operation is generally available, such vending machine controllers may be limited in the types of process flow methods that can be performed. As an example, it is common to find a vending machine controller that first requires an input of money, secondly requires a product selection, and then thirdly dispenses the product from the vending machine. The trouble with such a mono-process flow method is that this often is not how consumers would prefer to interact on a purchase. In contrast, consumer insights typically suggest that consumers may prefer to select items first and then pay.

The inability to control the process flow of a vending cycle may prevent certain consumer preferences from being realized. Specifically, the process flow generally cannot be changed based on the type or kind of consumer using the vending machine. Consumer insight into how consumers prefer to buy products cannot be implemented and sales may be lost when vending machine operating models or process flows cannot be tailored to the type or kind of product or service being dispensed as well as to the type or kind of environment in which the vending machine is located.

In addition to the inability to control the process flow, equipping the vending machine with all of the electronics necessary to operate autonomously increases the cost of the machine while reducing its reliability, as there are more elements to malfunction. If energy management systems are required, even more electronics may be added. Likewise, if credit card readers are required then even more electronics may be added. Each system adds costs and each system must be maintained and serviced. The result is that more electronics then necessary may be deployed, resulting in increased costs, decreased reliability, more parts to stock, more service calls, and perhaps reduced vending route profitability.

Another issue in the vending industry is a large supply of used vending machines. In this regard, there are programs currently underway to refurbish used vending machines. Refurbished vending machines typically may be cheaper than a new machine such that a savings may be realized by the operator. Although cheaper, the refurbished vending equipment may have the same shortcomings as the exist equipment. If the shortcomings were overcome and if certain components in the refurbished vending machine were reduced or eliminated to improve overall reliability, costs could be less than a new machine. In cost sensitive channels, such as at work and other places where it is difficult to place venders, the channel may be a new and open marketing opportunity.

Another issue may be that the electronics used in vending machines may differ from that found in coolers, fountain dispensers and other devices. In this regard, there are no economies of scale, shared network services, or other synergies that may be realized because devices may utilize different and non-compatible technologies. As such, much time may be spent on electronics that can be added to a vending machine to provide payment and inventory information but little time may be spent on how a vending machine, a cooler, or other device may improve product quality, save energy, and effectuate new consumer experiences.

There is therefore a desire to improve the consumer experience, improve equipment reliability, and reduce the overall cost of the equipment. Specifically, there is a desire for a refurbished vending machine that overcomes the shortcomings mentioned above as well as reduces the cost of the equipment such that new markets may be opened. Furthermore, there is a desire to find synergies between the electronics used for vending machine, coolers, fountain equipment, and the like such that all such devices may realize economies of scale in manufacturing and operation.

SUMMARY OF THE INVENTION

The present application thus provides a vending machine system for dispensing goods or services. The vending machine system may include a vending machine with a vending mechanism, a data processing device remote from the vending machine, and a vending bridge. The vending bridge may be in communication with the data processing device and the vending mechanism of the vending machine so as to instruct the vending mechanism to dispense the goods or the services.

The vending bridge may include a consumer interface, a lighting control interface, a display interface, and/or a motor control interface. The data processing device may include a server, a personal computer, a payment icon, and/or a telephone. The data processing device may include a microprocessor readable medium having embodied thereon instructions that when executed perform: dispensing at least one of the goods or service from the vending machine, receiving consumer payment information, and charging for the goods or services.

The vending machine may include a refrigeration system and the data processing device may control the refrigeration system via the vending bridge. The data processing device may include a microprocessor readable medium having embodied thereon instructions that when executed perform: receiving humidity data, determining if condensation will form on surfaces of the vending machine, and controlling the refrigeration system to prevent the formation of condensation. The vending bridge may include a refrigeration control interface in communication with the refrigeration system and the data processing device. The refrigeration control interface may include a compressor control interface, one or more temperature sensors, a compressor control interface, one or more fan control interfaces, and/or a remote motion detector.

The data processing device may include a microprocessor readable medium having embodied thereon instructions that when executed perform: managing a night time mode of operation of the vending machine. The data processing device may include a microprocessor readable medium having embodied thereon instructions that when executed perform: receiving a communication from a consumer, determining if dispensing the goods or services is approved, and dispensing of the goods or services.

The data processing device may include a vending operations server. The virtual bridge may include a microprocessor readable medium having embodied thereon instructions that when executed perform: storing a number of vending operations data when a vending operations server is off-line and communicating the number of vending operations data to the vending operation server when the vending operations server is on-line.

The vending bridge may include a microprocessor readable medium having embodied thereon instructions that when executed perform: managing energy usage and efficiency of the vending machine. The data processing device may include a number of virtual equipment modules. The vending machine system further may include a payment services system in communication with the data process device, a consumer interaction system in communication with the data process device, a route operations system in communication with the data process device, and/or an accounting services system in communication with the data process device. The vending machine may include a fountain dispenser or a cooler.

The present application further provides a vending machine system for dispensing goods or services. The vending machine system may include a vending machine with a vending mechanism, a data processing device remote from the vending machine, and a vending bridge. The vending bridge may be in communication with the data processing device and the vending mechanism of the vending machine such that the data processing device may receive consumer payment information and cause the vending mechanism to dispense the goods or the services.

The present application further describes a method for dispensing goods or services from a vending machine system to a consumer. The method further may include selecting the good or service, forwarding the selection to a remote data processing device, determining at the data processing device if the selection is authorized, and directing the vending machine to dispense the selection is authorized.

These and other features of the present application will become apparent to one of ordinary skill in the art upon review of the following detailed description when taken in conjunction with the several drawings and the appended claims.

DETAILED DESCRIPTION OF THE INVENTION

Figure 1A:
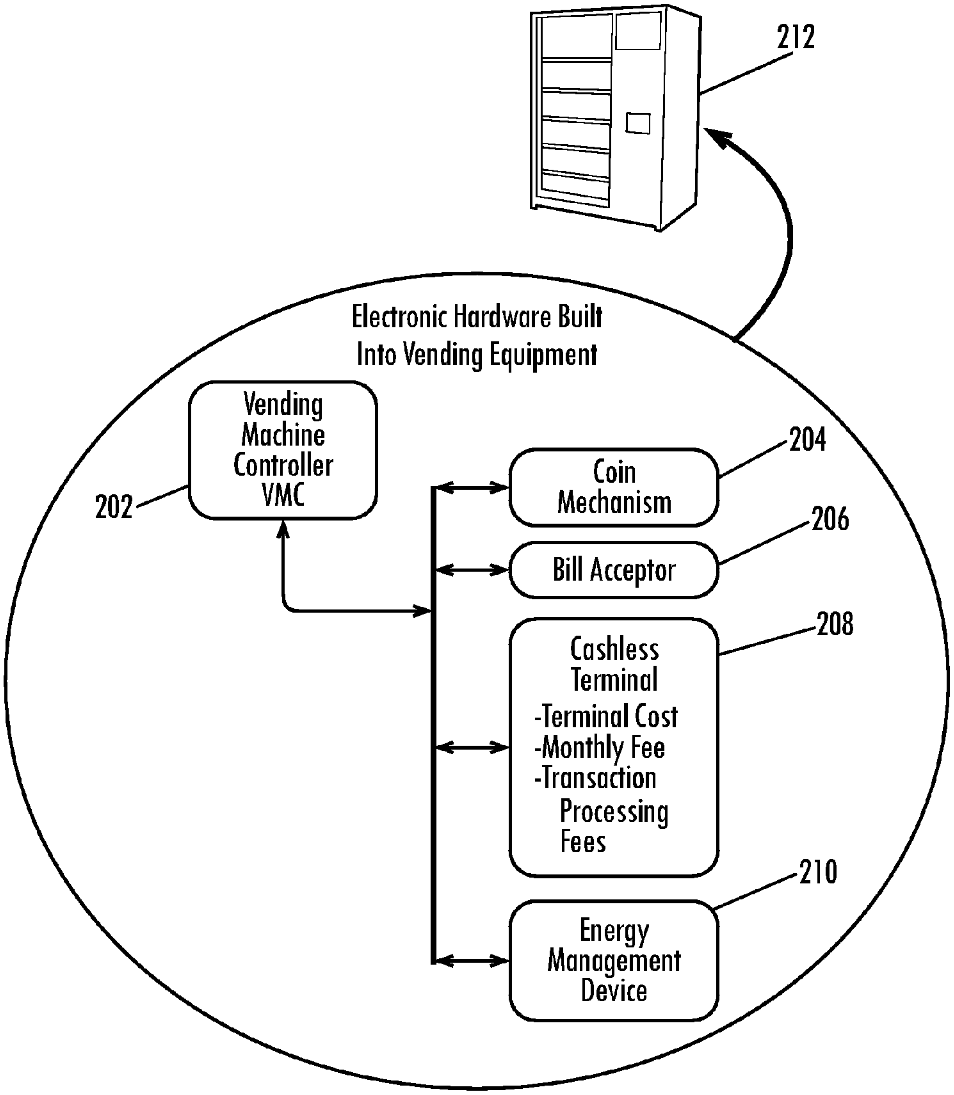
Prior Art Fig. 1A
FIG. 1A illustrates one example of a prior art vending machine.

Turning now to the drawings in greater detail, it will be seen that in FIG. 1A there is illustrated one example of a known vending machine 212. The vending machine 212 may include a vending machine controller (VMC) 202 and a number of peripherals. Such peripherals may include a coin mechanism 204, a bill acceptor 206, a cashless terminal 208, an energy management device 210, and similar devices.

In operation, the vending machine controller 202 may interface with the various switches, sensors, motors, and peripherals of the vending machine 212. The vending machine controller 202 may implement the protocols and communications necessary to operate the attached peripherals. These protocols and communications may include industry standards such as a multi-drop-bus (MDB), a data exchange interface (DEX), and similar devices. These protocols and communication standards are supported by the European Vending Association (EVA) and The National Automated Merchandising Association (NAMA). Other known vending machines 212 also include other types and kinds of protocols and communications to support the peripheral devices.

The vending machine controller 202 also includes all the necessary logic and decision making capability to accept money from consumers, determine sold out products, determine product selection by a consumer, and dispense products. In general, the vending machine controllers 202 used in the known vending machines 212 included all that is necessary to enable the vending machines 212 to operate autonomously. The vending machines 212 required no external support, such as networking or external data communications, for vending operations.

The known vending machines 212 also may be characterized by the need for a host of peripheral devices required to accept payment from a consumer. In this regard, a coin mechanism 204 such as a COINCO, MARS/MEI, or other types or kinds of coin mechanisms, may be required to accept coins. A bill acceptor 206, such as a COINCO, MARS/MEI, or other types or kinds of bill acceptors, may be required to accept currency bills. A cashless terminal 208, such as an ISOCHRON, USA TECHNOLOGIES, TRANSACTION NETWORK SERVICES (TNS), MARS/MEI, or other types or kinds of cashless readers, may be required to accept credit card payments. In addition to the cost of the cashless terminal hardware, monthly service fees and transaction processing fees may be required.

The known vending machines 212 also may be characterized by having a refrigeration system to keep cold the products therein. In this regard, vending machines 212 are typically manufactured such that the vending machine controller 202 turns the cooling system "ON" and "OFF" as required to keep the products at the desired temperature. Many vending machine controllers 202 perform this refrigeration control function with little consideration of the consumer traffic or the buying usage patterns of the vending machine 212. As a result, the known vending machines 212 generally may not be energy efficient. To supplement these shortcomings, energy management devices 210 may be added for an additional cost. Once installed, various types of "smart" algorithms with varying levels of performance may be employed in an attempt to better manage the refrigeration cycle and to save energy.

Another characteristic of the known vending machines 212 is that the vending machine controller 202 and the array of peripherals are all built into the cabinet of each vending machine 212. In this regard, the vending machines 212 operate in autonomous mode and are packed full of single functionality electronics. As such, the known vending machines 212 may be relatively expensive. In addition, operators generally have to pay transaction processing fees that cut into profits to process cashless payments from consumers.

Service technicians find that such vending machines 212 may be somewhat unreliable. Moreover, such vending machines 212 require service to clean, repair, and replace the associated electronics and peripherals devices. In addition, upgradeability, variations between equipment models, and compatibility issues between peripheral devices may give rise to operational underperformance and high costs to operate vending routes.

Figure 1B:
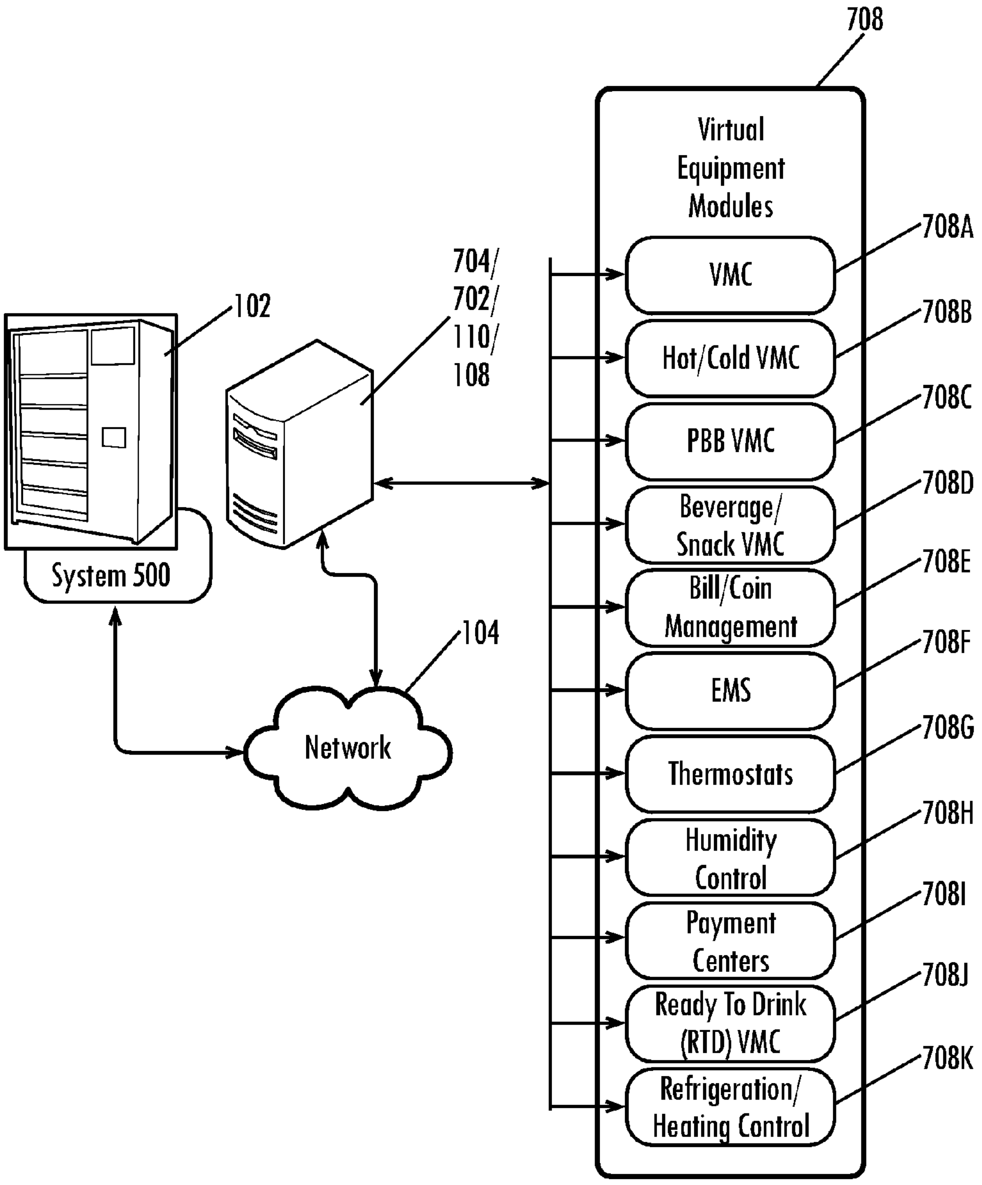
FIG. 1B illustrates one example of a vending machine system having a vending bridge.

In contrast, FIG. 1B illustrates one example of a vending machine 102 as is described herein. The vending machine system 102 may include a vending bridge 500. The existing vending machine controller, the peripherals, and other associated electronics are removed from the vending machine 102. As such, a cost savings and an increase in vending machine reliability may be realized. In lieu of the existing vending machine controller and peripherals, the vending machine 102 utilizes the vending bridge 500 in communication with the vending machine 102.

The vending machine 102 may include, but is not limited to, a product or beverage dispenser, a vending machine, a snack dispenser, a device capable of dispensing or providing a consumable food or drink item, a device capable of dispensing or providing a non-consumable item, or a device capable of facilitating the purchase of a good and/or service. The vending machine 102 may include a vending machine 102A, a cooler 102B, a fountain dispenser 102C, and similar devices. The vending machine 102 also may be referred to as immediate consumption equipment, immediate consumption equipment 102, a virtual vending machine 102, equipment 102, cooler equipment 102, fountain equipment 102, or vending equipment 102. Vending, cooler, and fountain equipment also may be referred to as the vending machine 102.

In an exemplary embodiment, a virtual equipment module replaces the electronic hardware in the known vending machines with networked virtual equipment modules that reside external to and remote from the vending machine 102. As an example, a known vending machine controller 202 may be replaced with a virtual vending machine controller 708A. In operation, the vending bridge 500 may be in data communication with the virtual vending machine controller 708A, resident external to and remote from the vending machine 102. The virtual vending machine controller 708A may receive data, determine sold out status, manage space to sales dispensing, account for consumer payment, reconcile consumer selection to product location, and remotely send data communications to effectuate the dispensing of products or services from vending machine 102.

Such virtual equipment modules 708 may include the virtual vending machine controller 708A, a virtual hot/cold vending machine controller 708B, a virtual premium brewed beverage (PBB) vending machine controller 708C, a virtual beverage or snack vending machine controller 708D, a virtual bill or coin management 708E, a virtual energy management system (EMS) 708F, a virtual thermostat 708G, a virtual humidity control 708H, a virtual payment centers 708I, a virtual ready-to-drink (RTD) vending machine controller 708J, and/or other types and kinds of virtual equipment modules. The virtual equipment modules 708 may control any and/or all of the functionality of the vending machine 102. The vending machine 102 thus may utilize one or more virtual equipment modules 708, as may be required and/or desired. The vending machine 102 may communicate by way of a network 104 to the virtual energy management system 708F whose functionality is, among other things, to improve the energy utilization and equipment operation as it relates to energy utilization.

The vending machine 102 may be networked to the virtual equipment modules 708 by way of the network 104 and a data processing device. Such a data processing device may be a switch type server 704. Data communications may arrive at the switch server 704 and be routed appropriately to the virtual equipment modules 708. A data processing device also may be a micro-switch server 702. Whereas the switch server 704 may be designed to handle heavy data loads and communications from many different vending machines 102, the micro-switch server 702 may be more suited for office, school, hospital, and other applications where a smaller population of vending machines 102 may be used. The servers 704, 702 may be referred to as a virtual vend server. In addition, a data processing device 108 or a personal computer 110 may operate in the role of a server. As such, the data processing device 108 and the personal computer 110 also may be referred to as the server 108, 110 or the virtual vend server 108, 110.

In a number of applications, the functionality offered by the micro-switch server 702 and the switch server 704 may be comparable. In addition, the micro-switch server 702 may be networked to the switch server 704 so as to create a network of micro-switch servers. Likewise, the personal computer (PC) 110 may run desktop type software applications that supports the virtual equipment modules 708 and/or be networked to the micro-switch servers 702 or the switch servers 704. In addition, the PC 110 may communicate with the vending machine 102 by way of web browser access, desktop type applications, and the like. The personal data device 108 may be a wireless phone, a personal data assistant (PDA), a pocket PC, an IPHONE, and the like. The network 104 may be a global network, the Internet, a local area network (LAN), a wide area network (WAN), or a virtual private network (VPN). Furthermore, the network 104 may be wired and/or wireless. Specifically, the network 104 may include Ethernet, 802.11 wireless, GPRS, GSM, 1XRTT, CDMA2000, 3G, 4G, and other types and kinds of wired and or wireless data communication protocols, and/or technologies.

With respect to the virtual hot/cold vending machine controller 708B, functionality may include, for example, managing on-demand heating and cooling of goods or services available from the vending machine 102 and similar functions. Various product storage areas may be maintained at different temperatures. Products also may be stored at or near room temperature and then rapidly heated or cooled to a predetermined ready to serve temperature after selection by a consumer. In addition, management of parameters, such as shelf storage life, may be effectuated by way of the virtual hot/cold vending machine controller 708B.

With respect to the virtual premium brewed beverage (PBB) vending machine controller 708C, functionality may include, for example, receiving a consumer's selection of a customized Barista style beverage and remotely controlling the vending machine 102 to form the customized beverage. Such customized Barista style beverages may include coffees, teas, espressos, hot chocolates, and other types and kinds of customized beverages. Remote formation of such a beverage may include remotely controlling beverage composition, brewing times, additives, shake or stirring, condiments, and similar functions.

With respect to the virtual beverage or snack vending machine controller 708D, functionality may include, for example, managing out of range temperatures and power conditions to insure product integrity. Similar functions may be included herein.

With respect to the virtual bill or coin management 708E, functionality may include, for example, managing payment, managing change dispersion, and related service conditions, including alerts, and calls to maximize service performance and better insure consumer vending satisfaction. Similar functions may be included herein.

With respect to the virtual energy management system (EMS) 708F, functionality may include, for example, managing energy efficiency, monitoring utilization and parts usage patterns, implementing algorithms to save energy, insuring optimum product delivery temperature, and extending the service life of the refrigeration components through smart usage algorithms and cleaning features. Similar functions may be included herein.

With respect to the virtual thermostat 708G, functionality may include, for example, remotely managing vending machine performance, refrigeration, and/or heating, by monitoring ambient, product, and other temperatures. With respect to the virtual humidity control 708H, functionality may include, for example, remotely managing vending machine performance, refrigeration, and/or heating by way of monitoring ambient, product, and other humidity levels. As an example, temperature and humidity may be remotely monitored. A determination may be made as to whether condensation has the likelihood of forming on the surfaces of the vending machine 102 such as on the cooler glass doors. As necessary, communication with the vending machine 102 may effectuate steps including heating the glass, changing air flow patterns, controlling refrigeration cycles, or optimizing vending machine settings to prevent, mitigate, or treat condensation formation.

With respect to the virtual payment centers 708I, functionality may include, for example, managing the remote acceptance of payment such as coins, bill currency, or cashless transactions, pooling payment at central locations to allow a consumer to operate a number of different vending machines 102, revaluing cashless accounts or authorizing purchases, accounting for the remote acceptance of coins, bill currency, or other payments, managing promotions, and being responsive to remote data communications that may indicate whether to accept payments, and similar functions.

With respect to the virtual ready-to-drink (RTD) vending machine controller 708J, functionality may include, for example, receiving consumer selections and preferences, managing vending machine operations, preparation and dispensing of RTD products and services in accordance with consumer preferences, including heating and cooling preferences, and similar functions.

Figure 1C:
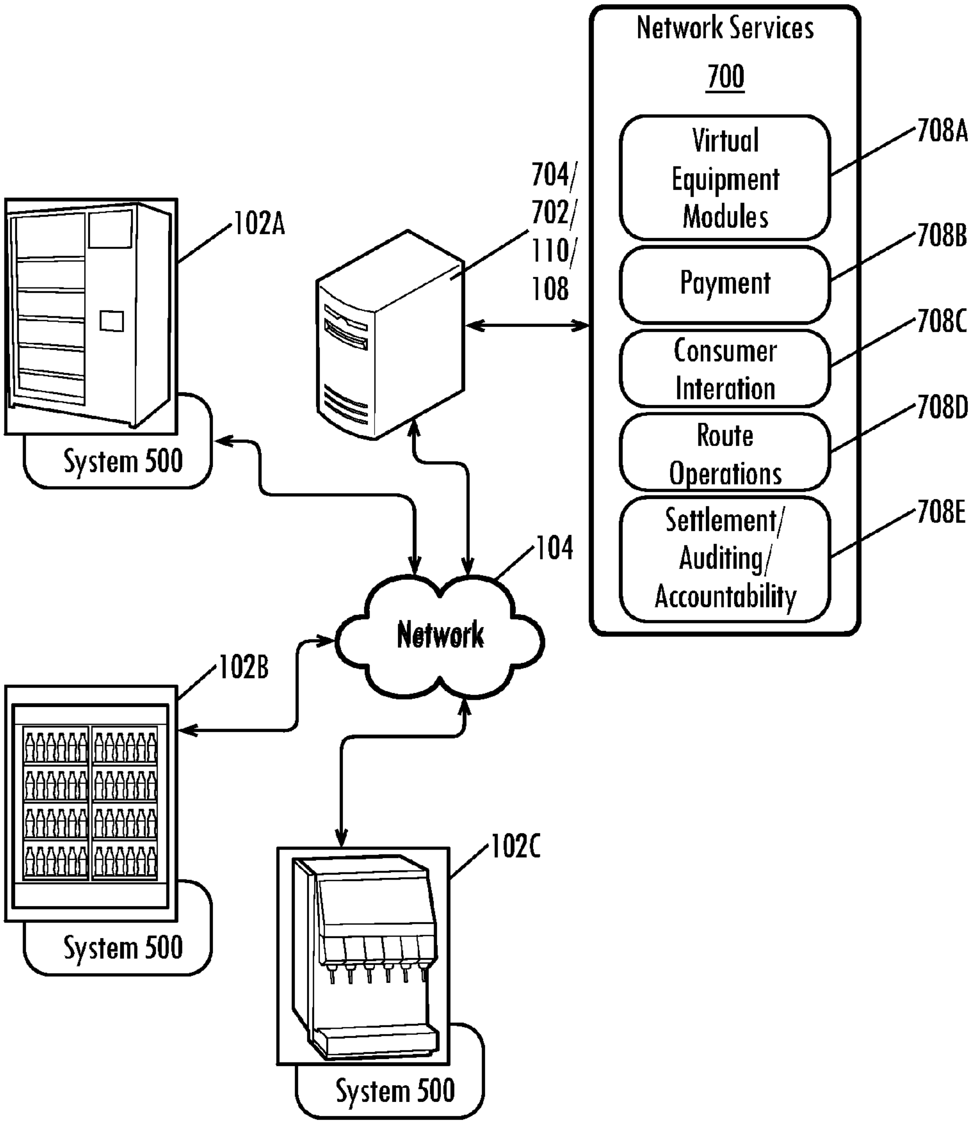
FIG. 1C illustrates one example of an immediate consumption equipment network, wherein vending bridges are used to network vending machines, coolers, and fountain dispensers to network services including virtual equipment modules.

Referring to FIG. 1C, there is illustrated one example of an immediate consumption equipment network. Vending bridges 500 may be used therein to network the vending machines, the coolers, and the fountain dispensers to the network services 700 including the virtual equipment modules 708. The vending bridge 500 may be embodied in the vending machine 102A, the cooler 102B, and/or the dispenser 102C. A number of network services external to and remote from the vending equipment 102A-C may be utilized to provide operational control, decision making, optimization, and other functionality. The vending machine 102A, the cooler 102B, and the dispenser 102C may be referred to as a vending machine 102, vending equipment, vending equipment 102, or immediate consumption equipment. The vending bridge 500 includes all functionality and communications between the virtual equipment modules 708 and the individual components of the vending machine 102.

An immediate consumption global network 705 may be characterized as having a number of network services 700. Such network services 700 may include, for example and not a limitation, virtual equipment module services 708, payment services 712, consumer interaction services 714, route operation services 706, and settlement auditing and accountability services 710. Furthermore, the vending machine 102 (which includes vending machine 102A, cooler 102B, and dispenser 102C) may be networked to the network services 700 by way of the network 104 as well as the micro-switch server 702, the switch server 704, the personal computer 110, the personal data device 108, or other devices.

With respect to the virtual equipment module network services 708, functionality may include, for example, receiving data, determining sold out status, managing space to sales dispensing, accounting for consumer payment, reconciling consumer selection to product location, and remotely sending data communications to dispense the products or services from the vending machine 102, and similar functions.

With respect to the payment network services 712, functionality may include, for example, managing consumer accounts, authorizing transactions, interfacing with third party backend servers and systems, facilitating consumer payments, hotel room key payments, employee badge payments, school ID payments, loyalty programs, stored value systems, credit card system, campus systems, web pay innovation payment systems, payment icon systems, and similar functions.

With respect to the consumer interaction network services 714, functionality may include, for example, managing consumer vending occasion preferences, managing digital vending solutions and interactive media content, interfacing with global digital marketing platforms (GDMP), effectuating interactive packaging and mobile digital solutions, and similar functions.

With respect to the route operations network services 706, functionality may include, for example, supply chain management, scheduled service planning, predictive equipment maintenance, predictive restock, inventory management, route planning, pricing management, SKU management, space-to-sales management, and ready to drink (RTD) services, and similar functions.

With respect to the settlement, auditing, and accountability network services 710, functionality may include, for example, settling cashless transactions, reconciling coin, bill currency, and cashless transactions, auditing third party servers, managing data warehousing, performing data accountability services, and similar functions.

Figure 1D:
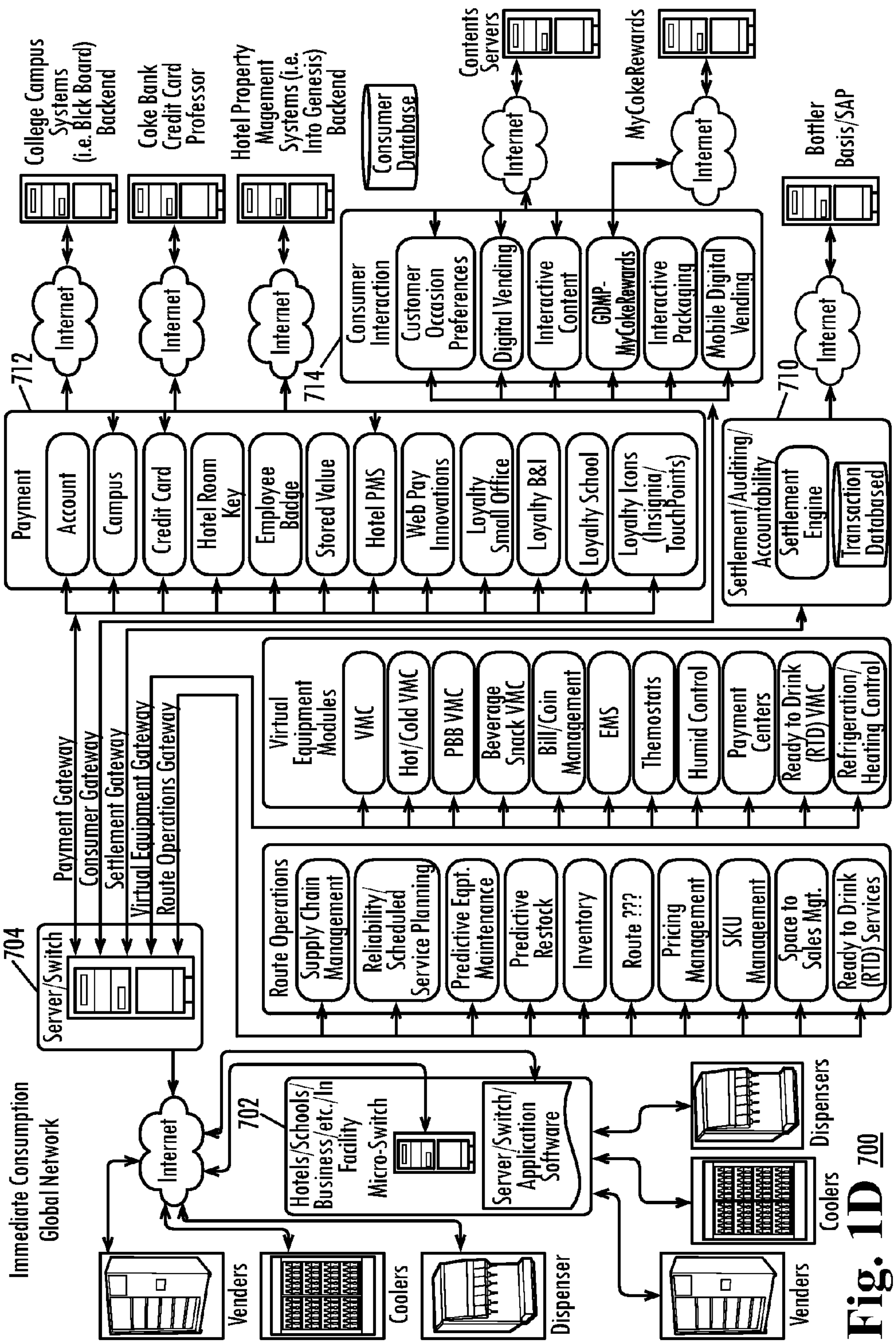
FIG. 1D illustrates one example of an immediate consumption global network.

Referring to FIG. 1D, there is illustrated one example of an immediate consumption global network 705. In an exemplary embodiment, a number of vending machines 102 having the virtual bridges 500 may be networked and access a number of the network services 700. The vending machines 102, by way of the vending bridge 500, may access network resources by way of the micro-switch servers 702, the switch servers 704, the network 104, and application software.

In a first embodiment, the application software may be executed on the micro-switch server 702. Less then all of the network services 700 may be implemented and the application software may be tailored for at work, at school, at hospital, at hospitality, and/or other market channels as may be desired. An advantage of this configuration is the reduced infrastructure requirement as opposed to support for all possible network services in a hosted network services model. This configuration also allows custom application software applications to be tailored for specific market channels, low cost and custom implementations, and other benefits.

In a second embodiment, a vending bridge 500 may access the switch server 704 directly or indirectly by way of the micro-switch server 702. In addition, a number of micro-switch servers 702 also may access the switch server 704 so as to utilize distributed networking to manage directly and indirectly the vending machines 102.

In operation, a number of the network services 700, including the virtual equipment modules services 708, the payment services 712, the consumer interaction services 714, the route operation services 706, and the settlement auditing and accountability services 710, may be accessed by a number of the vending machines 102 through a series of gateways. Such gateways may include, for example, payment gateways, consumer gateways, settlement gateways, virtual equipment gateways, route operations gateways, and other gateways.

Figure 2A:
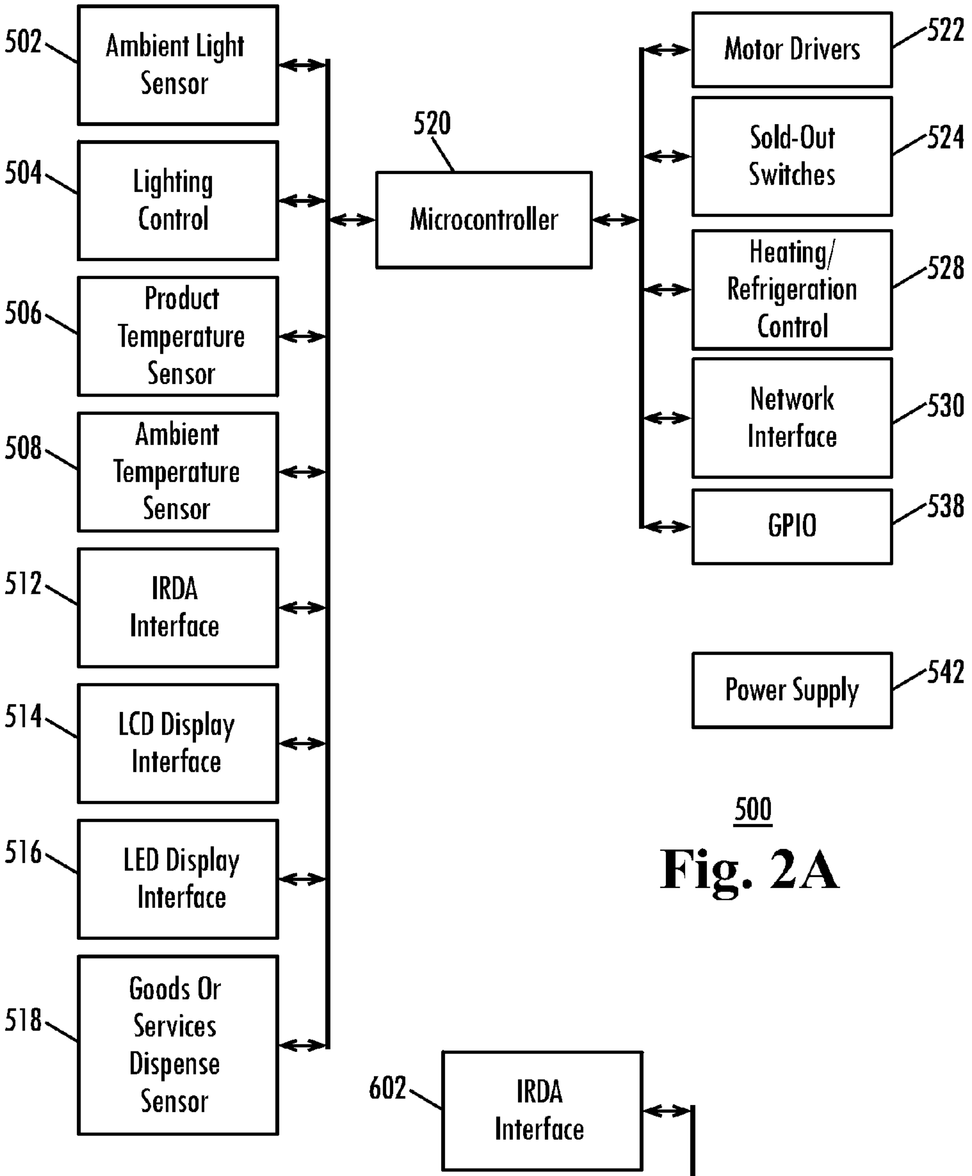
FIG. 2A illustrates one example of a vending bridge system 500.

Referring to FIG. 2A, there is illustrated one example of the vending bridge system 500. In an exemplary embodiment, the vending bridge 500 may be interconnected with a number of sensors, a vend dispense mechanism, and a network connection. In this regard, the dispense functionality is responsive to data communication received by way of a network interface 530 of the vending bridge 500. In addition, sensor data may be collected and communicated from the vending bridge 500 to remote data processing resources by way of the network interface 530.

Remote data processing resources may determine the state and status of the vending machine 102 by employing virtual software modules to effectuate refrigeration control, energy management optimization, vending machine control functionality, and other types and kinds of virtual equipment modules. Furthermore, consumer selections may be determined at the remote data processing resources so as to validate payments, and send the appropriate commands to cause the correct vending machine item to be vended or otherwise dispensed.

A microcontroller 520 may be interconnected with motor drivers 522, a sold-out interface 524, a heating/refrigeration control 528, a network interface 530, and a general purpose input/output (I/O) 528. The microcontroller 520 may be a microcontroller containing flash and random access memory (RAM) in addition to a number of on-chip features such as USB, I2C, UART, SPI, ETHERNET, and/or other types and kinds of interfaces. The microcontroller 520 may be a MOTOROLA, INTEL, FREESCALE, MICROCHIP, RABBIT, ZILOG, or other type and kind of microcontrollers, as may be required and/or desired in a particular embodiment. In a preferred embodiment, the microcontroller 520 may be a ZILOG F91 EZ80 ACCLAIM PLUS microcontroller or configured as a ZWLOG F91 EZ80 ACCLAIM PLUS SINGLE BOARD COMPUTER (SBC). The microcontroller 520 may be referred to as a microprocessor.

The motor drivers 522 may be configured to drive the existing dispense motor in the vending machine 102. As such, the motor driver 522 may be configured to drive one or more stepper motors, AC or DC motors, or other types and kinds of motors as may be desired. The motor drivers 522 may utilize relays, triacs, zero crossing opto-isolated drive circuits, stepper motor driver integrated circuits, field effect transistors (FETS), MOSFETS, TRANSISTORS, and/or other types and kinds of devices to control the motors.

The vending bridge 500 may be installed within a refurbished vending machine 102. As such, the motor drivers 522 may interconnect with the dispense motor of the refurbished vending machine such that the motor drivers 522 dispense products and/or services by way of network control. One such refurbished vending machine that can be utilized with the vending bridge 500 includes the ROYAL 660 sold by Royal Vendors of Keameysville, W.Va. The ROYAL 660 utilizes a single stepper motor to dispense products from a number of inventory storage chutes or bin areas. The motor drivers may be configured to drive the stepper motor to dispense the products from the various storage chutes or bin areas.

The sold-out interface 524 may be mechanical, optical, or other types and/or kinds of sold-out switches. The sold-out switches 524 indicate which products are out of stock. Such information may be communicated to the remote data processing resources wherein consumer and route servicemen can be notified as appropriate.

When retrofitting the vending bridge 500 into a vending machine, there may be sold-out switches mounted in places that can be utilized by the vending bridge 500. The sold-out interface 524 may be connected to the preexisting sold-out switches already in the vending machine 102. Alternatively, some vending machines use a “drop sensor” to determine if a selected product “drops” and is actually vended. In operation, if the selected product fails to vend then it is considered to be out of stock or sold-out. The sold-out interface 524 may be configured to use the existing sold-out switches of the vending machine 102, interface to the existing “drop sensor”, or accommodate the adding of at least one sold-out sensor or switch to detect when inventory products are sold-out. Such a sold-out interface 524 may be switches, optical sensors, audible sensors, vibration sensors, and/or other types and/or kinds of sold-out switches, as may be desired. Preferably, the sold-out interface 524 may be configured to indicate when a product is sold-out prior to a consumer selecting and being denied a successful vend as is the case with the known vending machines.

The heating/refrigeration control 528 controls the vending machine refrigeration system. The remote data processing resources may monitor refrigeration system operation, control the compressor “ON” and “OFF” cycles, and optimize energy savings aspects of the refrigeration system. As illustrated in FIG. 2D, the heating/refrigeration control 528 may further include a compressor interface 528A, an evaporator fan interface 528B, a line power interface 528C, a reverse relay 528D, a high temperature sensor 528E, a return air sensor 528F, a remote motion detector 528G, a user interface 528H, a general purpose input/output (I/O) 528I, an evaporator sensor interface 528J, an independent condenser fan interface 528K, an electronic evaporator valve (EEV) interface 528L, a general purpose input/output night mode button 528M, a variable speed evaporator fan interface 528N, and other components.

The compressor interface 528A may be a high current high capacity relay capable of switching the vending machine compressor power “ON” and “OFF”. Such a compressor interface 528A may be a POTTER & BRUMFIELD T9AS1D12-12 relay or other types and kinds of interface.

An evaporator fan interface 528B may be a relay capable of switching the vending machine evaporator fan “ON” and “OFF”. Such an evaporator fan interface 528B may be a TYCO RTD14012 relay or other types of relays.

The line power interface 528C may supply power to the system 705 as a whole. Such a power supply may have an isolation transformer, wherein a high voltage sense output is available to effectuate the ability of the vending bridge 500 to monitor the supply line voltage, monitor supply line status, line voltage anomalies including brown-out detection, and monitor other types and kinds of line supply conditions as may be desired. In addition, at least one low voltage step down power output in the range of about five (5) to about thirty (30) DC volts may be provided to supply low voltage to the semiconductor, logic, and other portions of the vending bridge 500. Such low voltage power output may be DC power that may be obtained by way of a diode bridge and/or suitable switching or linear voltage regulators. In a preferred embodiment, a four diode bridge and a linear 7805, or 7812 voltage regulator, 3.3V or 5VDC switching voltage regulator may be used to supply +VDC to the appropriate portions of the system.

The reverse relay 528D may be a relay capable of switching the rotational direction of the vending machine condenser fan. In this regard, reversing the normal direction of the condenser fan may cause dirt, dust, and other particulates to be blow off of the condenser coils. This in effect cleans the condenser, which in turn keeps the refrigeration system performing at an optimum efficiency. Such a reverse relay 528D may be a TYCO RTD14012 relay or other types of relays.

The high temperature sensor 528E may be positioned to monitor the temperature of the compressor to avoid overheating and/or compressor damage. Such a high temperature sensor 528E may be a thermister or other type or kind of temperature sensor.

A return air sensor 528F may monitor the efficiency of the refrigeration system. The return air sensor 528F may monitor the airflow that is being circulated through the vending machine or cooler refrigeration compartment.

The remote motion detector 528G may be utilized to monitor the presence of a consumer 106 in front of the vending machine 102. Monitoring the foot traffic in and around the vending machine or cooler may utilize energy savings algorithms to optimize the operation of the cooling system so as to save energy when consumers 106 are generally not expected to be in and around the vending machine 102. As an example, energy savings may be optimized during periods when the location is closed or the employee break room is empty. In addition, such occupancy monitoring may be used to determine when and how the vending machine 102 and the refrigeration system should operate to insure that a cold product is delivered at the optimum ice cold temperature every time.

The user interface 528H may be utilized to allow a customer or equipment operator to see displayed information as well as make certain adjustments. Such adjustments may include entering the night mode, setting refrigeration temperature, resetting alarms, display status of the compressor, the fans and other components, or other type and kinds of user interface display features.

The general purpose input/output (I/O) 5281 may be utilized to interface with other refrigeration system components to effectuate monitoring and/or control of the vending machine 102 or the cooler refrigeration system.

The evaporator sensor interface 528J may be utilized to monitor the operation of the evaporator and/or the evaporator fan. Such an evaporator sensor interface 528J may be a buffered input to the microcontroller 520.

The independent condenser fan interface 528K may be a relay capable of switching the vending machine condenser fan “ON” and “OFF”. Such an independent condenser fan interface 528K may be a TYCO RTD14012 relay or other type of relay.

The electronic evaporator valve (EEV) interface 528L may be utilized to operate an EEV. Such an EEV may be used to adjust the size and/or the length of the heat exchanger coils thus changing certain refrigeration system operational characteristics.

The general purpose input/output night mode button 528M may be provided to receive and buffer inputs to the system and drive certain system output loads. The night mode button 528M signals that the location is closing for the night. This operator input informs the vending bridge 500 that it can switch to energy saving mode and otherwise prepare the vending machine 102 for an overnight duration, wherein little to no vending activity can be expected.

The variable speed evaporator fan interface 528N may provide a variable drive speed for an evaporator fan. Energy can be saved by running the evaporator fan at only the required speed to maintain cooling efficiency, slowing the fan, and saving power whenever possible.

The network interface 530 may provide network connectivity to the vending bridge 500. The network interface 530 may be an ETHERNET, FIREWIRE, or other type or kind of network interface. Furthermore, the network interface 530 may provide local area network access (LAN), wide area network access (WAN), wired network access, wireless network access, or other types or kinds of network access.

The general purpose input/outputs (I/O) 528 may receive and buffer inputs to the system and drive certain system output loads.

Also interconnected with the microcontroller 520 may be an ambient light sensor 502, a vending machine or cooler lighting control 504, a product temperature sensor 506, an ambient temperature sensor 508, an infrared data communication interface (IRDA) 512, a liquid crystal display (LCD) or vacuum florescent display (VFD) interface 514, a light emitting diode (LED) interface 516, a goods or services dispensed sensor 518, and a power supply 542. Other components may be used herein.

The ambient light sensor 502 may monitor the light level around the vending machine 102. Lighting patterns may be used to determine if the vending machine 102 is indoors or outdoors and/or whether it is daytime or nighttime. Such information may then be used in various algorithms including, for example, lighting algorithms, operational algorithms, energy savings algorithms, or other types and kinds of algorithms or applications.

The vending machine lighting control 504 may be implemented to light the interior and/or exterior of the vending machine 102. In this regard, door, cabinet, shelving, or other elements of the vending machine 102 may be illuminated with various types of lights including light emitting diodes (LEDs). Such lighting may be controlled in an "ON" and "OFF" fashion by way of a relay or a switch, or such lighting may be controlled by a variable luminance control circuit. Such "ON" and "OFF" relays may include a TYCO RTD14012 relay or other types of relays. Such a variable luminance control circuit may be implemented as necessary to provide dimming functionality to whatever types or kinds of LED or other type of lighting device as may be selected. Furthermore, the ambient light sensor 502 may be used in a lighting algorithm to determine when or which lights to illuminate the equipment 102. In addition, the ambient light sensor 502 may be used in energy saving algorithms to determine which and how bright the lights should be to adequately illuminate the vending machine 102 while saving energy when and where possible.

The product temperature sensor 506 may monitor the temperature of the products inside the vending machine 102. In this regard, such product temperature information may be utilized in various algorithms so as to control the refrigeration system to maintain proper product temperature.

The ambient temperature sensor 508 may be implemented to monitor the temperature around the vending machine 102. In this regard, such ambient temperature information may be utilized in various algorithms such as in control of the refrigeration system.

The infrared data communication interface (IRDA) 512 may be used to communicate between the vending bridge 500 and a payment icon 600. Such communication may include, for example, effectuating a vending cycle with the payment icon 600, exchanging data with the payment icon 600, or other types and kinds of communication with the payment icon 600, the data processing device, and/or other types and kinds of devices. Such an IRDA 512 may be implemented with a transmitter/receiver RDA module or other types and kinds of IRDA data communication devices.

The liquid crystal display (LCD) or vacuum florescent display (VFD) interface 514 may be used to implement a display. Such a display may be viewable by a consumer 106 or service technician so as to provide transactional, informational, service, and/or other types and kinds of display information. Such a liquid crystal display (LCD) or vacuum florescent display (VFD) interface 514 may be a color high resolution video display, a low resolution or monochrome display, a dot-matrix, a character based 2×16, 2×20, 4×20, or other character based display, or other types and /or kinds of displays.

The light emitting diode (LED) interface 516 may be implemented for certain informational purposes, to draw attention or attraction to the vending machine 102 or to certain aspects of the technology, or for other purposes. Such a LED interface 516 may be implemented with an array of various colored, color changing, and red-green-blue (RGB) type color changing LEDs.

The goods or services dispensed sensor 518 may be implemented and operated in a similar manner as sold-out interface 524. The power supply 542 may be implemented to supply power to the vending bridge 500.

In a number of embodiments, the vending bridge 500 may include more or less of the features detailed above. Market preference, costs, consumer insights, technical insights, business needs, and desired features may influence which of the features may be used for a particular embodiment. In addition, a number of vending bridge configurations may be implemented. Furthermore, different vending bridge configurations may be implemented for various types and kinds of the vending machines 102. A particular brand or model of the vending machines 102 may require certain vending bridge hardware configurations, whereas coolers or fountain equipment may require different hardware configurations. An example tailored for immediate consumption equipment such as the coolers 102 is detailed in FIG. 2C.

Figure 2B:
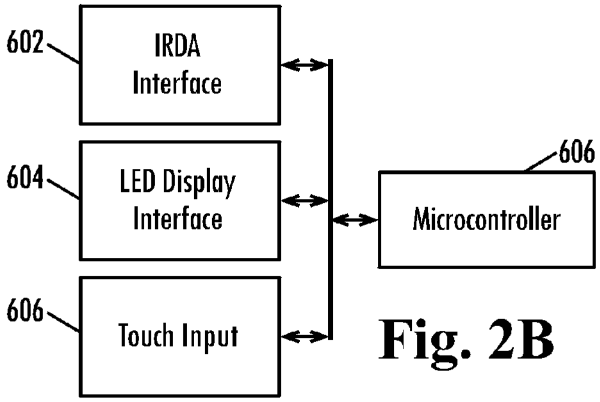
FIG. 2B illustrates one example of a payment icon system 600.

Referring to FIG. 2B, there is illustrated one example of the payment icon system 600. Such a payment icon 600 may be used by a consumer to effectuate vending cycles from the vending machines 102. The payment icon 600 may operate as a consumer interface to the vending machines 102 and/or a payment device having storing-accessing-loyalty-or other payment functionality. Such functionality may identify the consumer 106 and provide for billing and/or inventory release for goods and services dispensed from vending machine 102.

A microcontroller 606 may be interconnected with an IRDA interface 602, a LED display interface 604, and/or a touch input 606. The microcontroller 606 may be a MOTOROLA, MICROCHIP, RABBIT, ZILOG, or other manufacturer or brand. The microcontroller 606 may be referred to as a microprocessor.

An IRDA interface 602 may communicate with the vending bridge 500 by way of the IRDA interface 512. Such an IRDA interface 602 may be implemented in similar fashion and components as the IRDA interface 512.

A LED display interface 604 may provide LED lighting and display effects. Such LED lighting and display effects may make use of single and/or multicolor producing LED so as to allow a wide range of color options. Such effects may be tailored as may be desired.

A touch input 606 may be used to accept consumer input. Such consumer inputs may be used to make product selection, to manage account information, to change the color or functionality of the icon 600, or other consumer input. Touch input may be by way of capacitive sense, pressure sensitive surfaces, buttons, switches, or other touch input technologies.

Figure 2C:
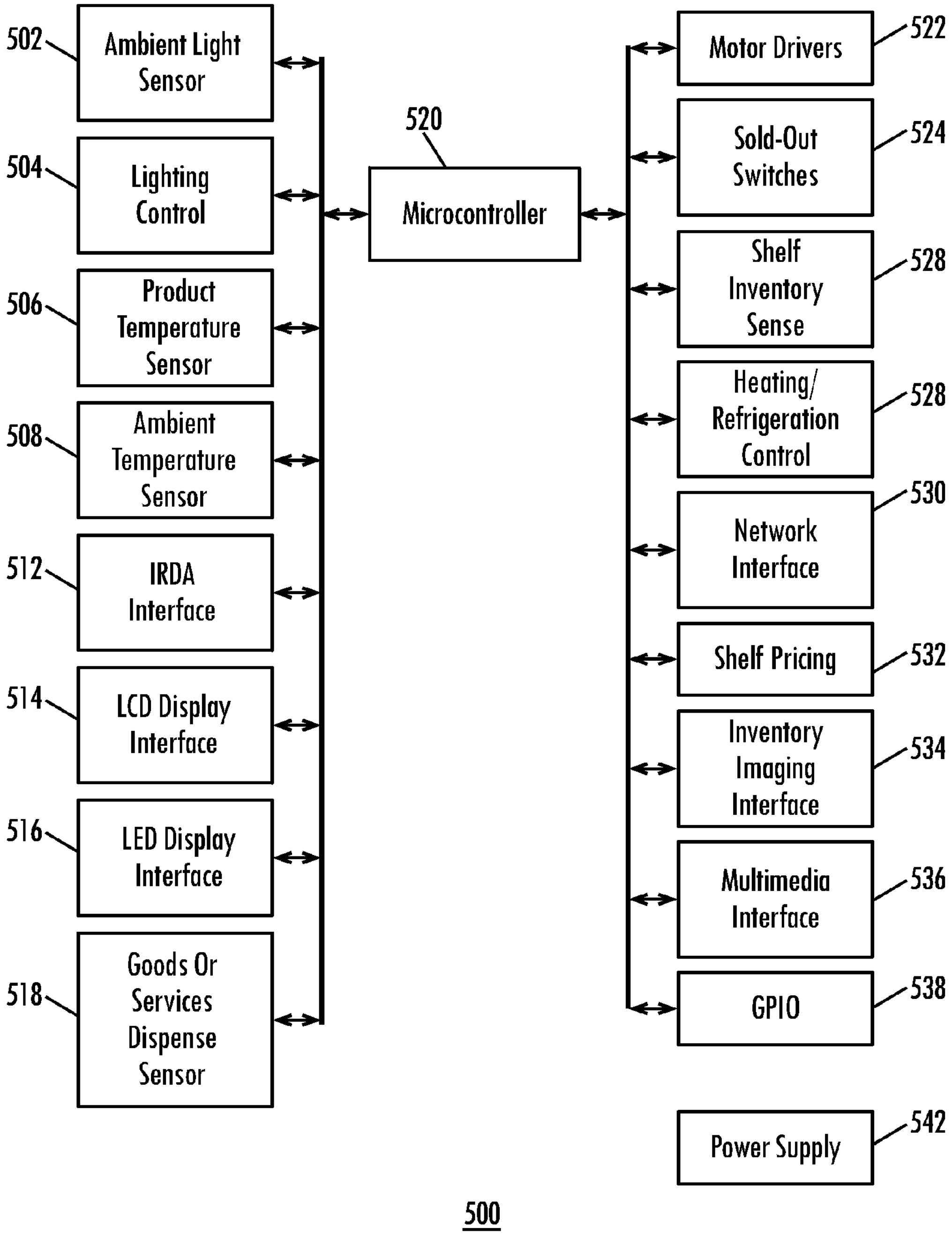
FIG. 2C illustrates one example of a vending bridge system 500 having cooler specific inventory management and pricing features.
Figure 2D:
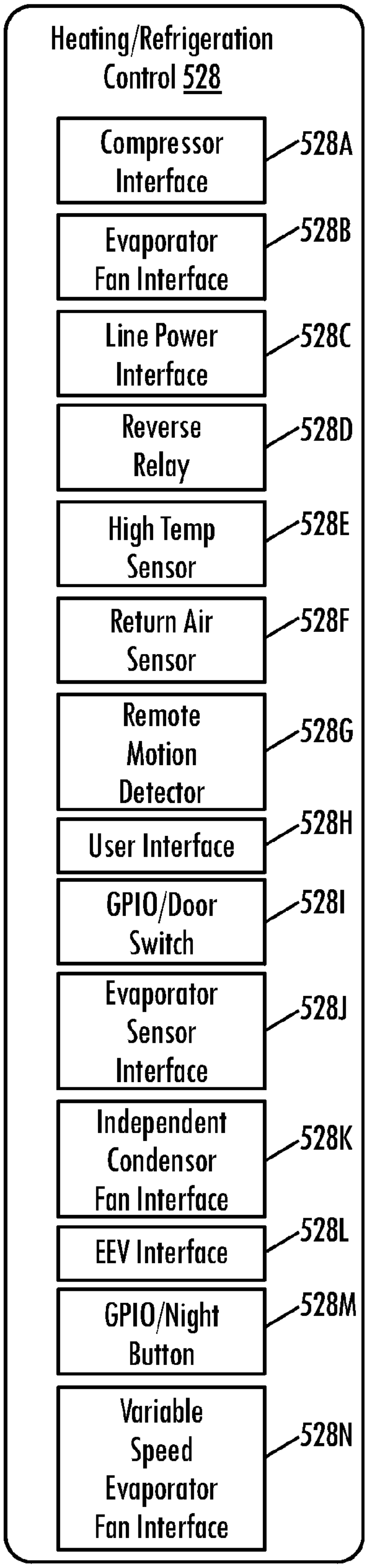
FIG. 2D illustrates one example of the heating and refrigeration control.

Referring to FIG. 2C, there is illustrated one example of a vending bridge system 500 having cooler specific inventory management and pricing features. The vending bridge 500 may be configured for operation in a vending machine 102 such as a cooler. Such a cooler typically may be one, two, or three door front open or top open refrigerated immediate consumption equipment having shelves for holding beverages, food, and other products.

A microcontroller 520 may be interconnected with the motor drivers 522, the sold-out interface 524, the heating/refrigeration control 528, the shelf inventory sense 526, the heating/refrigeration control 528, the network interface 530, the shelf pricing interface 532, the inventory imaging interface 534, the multimedia interface 536, and the general purpose input/outputs (I/O) 528. The microcontroller 520 may be interconnected with the ambient light sensor 502, the vending machine or cooler lighting control 504, the product temperature sensor 506, the ambient temperature sensor 508, the card reader interface 510, the infrared data communication interface (IRDA) 512, the liquid crystal display (LCD) or the vacuum florescent display (VFD) interface 514, the light emitting diode (LED) interface 516, the goods or services dispensed sensor 518, the power supply 542, and other components.

The shelf inventory sensor 526 may be used to monitor the product inventory on a shelf. As product is inserted into and removed from the vending machine 102, such inventory fluctuations may be monitored and used in inventory management data communications, inventory and refrigeration algorithms, or other types and kinds of shelf sensing applications. Such shelf inventory sensing may be effectuated by way of contact sensing, optical sensing, infrared sensing, radio frequency identification (RFID) tag sensing, or other types and/or kinds of sensing technologies.

The shelf pricing interface 532 may be utilized on the product shelves to indicate the price of the product. Changeable electronic signage may be implemented with LED, LCD, OLED (organic LED) display technology and/or with other types and/or kinds of display technology. The signage information may include the price of the products proximate to the display or shelf area, promotional advertising, informational advertising, or other types and/or kinds of signage information as may be desired. The shelf pricing interface 532 may be an I2C, SPI, serial, USB, IRDA, RS232, wired, wireless, direct display driving interface, GPIO, or other type of kind of interface.

The inventory imaging interface 534 may be used to take images of the inventory on the shelf. Such images may then be utilized to track changes by comparing prior images to current images so as to determine changes in inventory quantities, types, and/or product placement. Such changes may include the insertion or the removal of product from the vending machine 102 by service personal and/or the consumer 106. In addition, such inventory imaging interface 534 may be used to observe what and how consumer 106 makes their product selection and removes the product from the vending machine 102. Such an inventory imaging interface 534 may be a camera module strategically located in proximity to the inventory of the shelf. The inventory imaging device 534 may be a camera, a photo module, or other type or kind of inventory image device.

The multimedia interface 536 may be implemented to effectuate the ability to interconnect the vending bridge 500 to other multimedia display equipment. Such multimedia display equipment may include displays, projectors, or other types and/or kinds of multimedia display equipment. Such a multimedia interface 536 may be I2C, SPI, serial, USB, IRDA, RS232, wired, wireless, or other types and/or kinds of displays.

The card reader interface 510 may be used to allow a consumer 106 to use magnetic, RFID, smart, or other types and/or kinds of cards at the vending bridge 500. The card reader interface 510 may be a bit strobe type track 1, 2, and/or 3 type reader, a serial port interface style, a GPIO interface type reader, a card reader and card writer combination device, or other types and/or kinds of card readers.

Figure 2E:
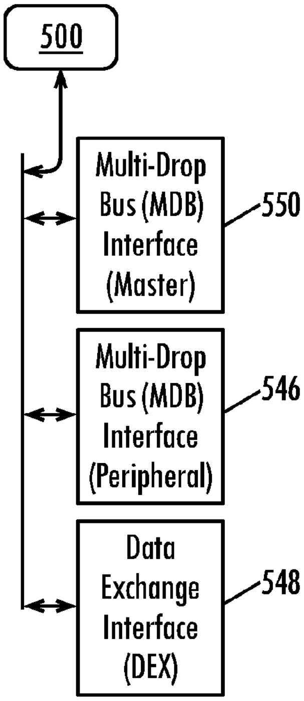
FIG. 2E illustrates one example of a vending bridge configured as a retrofit device having at least one MDB interface and/or a DEX interface.

Referring to FIG. 2E, there is illustrated one example of the vending bridge 500 configured as a retrofit device having at least one MDB interface and/or a DEX interface. The vending bridge 500 may be configured to operate with legacy vending equipment by connecting the system 500 to a multi-drop-bus (MDB) interface 550 configured to be a master, a multi-drop-bus (MDB) interface 546 configured to be a slave, and a data exchange interface (DEX) 548 configured to be able to poll machine information from an industry standard DEX port.

The MDB interfaces 550, 548 may be in optically isolated bidirectional serial data communications. The DEX interface 548 is a serial type interface. Interfaces 550, 546, and 548 may conform to vending industry standards such as National Automatic Merchandising Association (NAMA) MDB specification, EVS standards, European Vending Association (EVA) DEX specification, and/or other industry standards.

Figure 3:
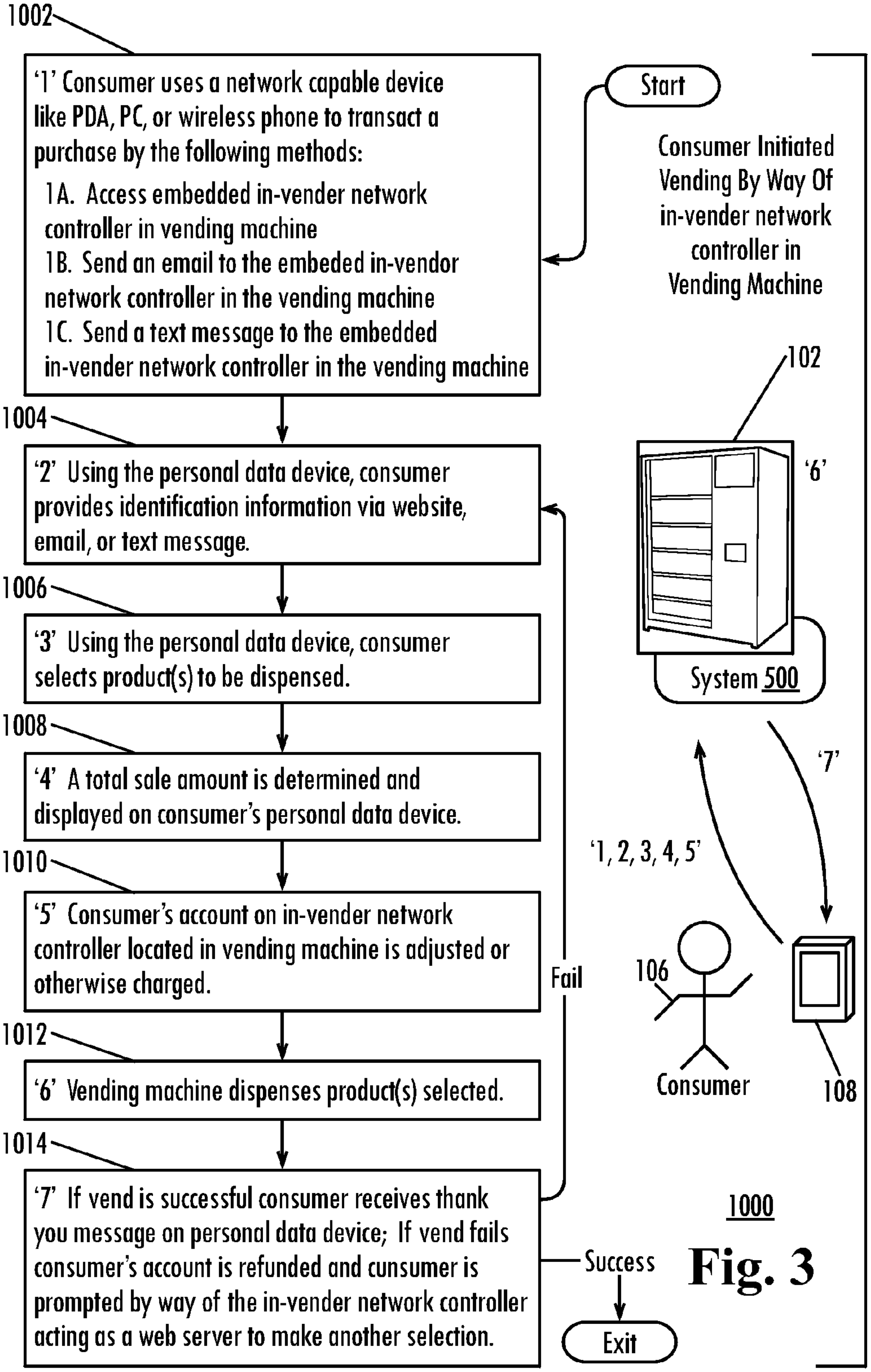
FIG. 3 illustrates one example of a method of consumer initiated vending by way of consumer-vender transaction interaction.

Referring to FIG. 3, there is illustrated one example of a method of consumer initiated vending by way of consumer-vender transaction interaction. The consumer 106 may use the personal data device 108 to initiate a vending transaction with the vending machine 102 by way of the vending bridge 500. In this regard, the consumer 106 may use the personal data device 108 to make product selection, approve any charges, and effectuate the dispensing of goods or service from the vending machine 102. Such a vending cycle may be completed and effectuated without the consumer having to touch the vending machine 102 to insert money or make a product selection.

Block 1002 illustrates data flow ‘1’, shown in the figure as a communication between the personal data device 108 and the vending bridge 500. As described above, the personal data device 108 includes a PDA, a PC, or a wireless phone having network capabilities. The consumer 106 uses the personal data device 108 to transact a purchase (also referred to as a vend cycle) by accessing the vending bridge 500. The vending bridge 500 is configured to operate as a web server to provide content to the personal data device 108. The personal data device 108 may send email type data communications, a text message, or other information to the vending bridge 500. The communication protocol between the personal data device 108 and the vending bridge 500 may be HTTP, HTTPS, SNMP, or other types and/or kinds of protocols.

Block 1004 illustrates data flow ‘2’, shown in the figure as communication between the personal data device 108 and the virtual bridge 500. Using the personal data device 108, the consumer 106 may provide identification, payment, or other information as may be desired via website/web-based type data entry, email type data entry, text messaging type data entry, or by other methods. The vending bridge 500 may provide goods or services inventory, sold-out status, pricing, and/or other information to the personal data device 108.

Block 1006 illustrates data flow ‘3’, shown in the figure as communication between the personal data device 108 and the vending bridge 500. Using the personal data device 108, the consumer may select the products or services to be dispensed.

Block 1008 illustrates the data flow ‘4’, shown in the figure as communication between the personal data device 108 and the vending bridge 500. A total sales amount may be determined and displayed on the consumer’s 106 personal data device 108.

Block 1010 illustrates the data flow ‘5’, shown in the figure as communication between the personal data device 108 and the vending bridge 500. The consumer’s account or other purchase approval authorization located on the vending bridge 500 or accessible by way of the vending bridge 500 may be adjusted or otherwise charged for the selected products or services.

Block 1012 illustrates the vending machine 102 activity '6', shown in the figure as the process of dispensing the goods or services from the vending machine 102. The vending machine 102 dispenses products or services in a certain quantity from a certain product or service storage location as instructed by the vending bridge 500.

Block 1014 illustrates the data flow '7', communication between the vending bridge 500 and the personal data device 108. If the vend cycle was successful, that is the product or service was successfully vended, the consumer 106 receives a confirming and/or "thank you" type message viewable on the vending machine 102 or preferably viewable on the personal data device 108. If the vend cycle was not successful, that is the product or service did not successfully vend, then the consumer 106 account is refunded and the consumer 106 is prompted by way of the vending machine 102 or preferably the personal data device 108 to make another selection. On vend success, the routine is exited while on vend fail the processing returns to block 1006.

Figure 4:
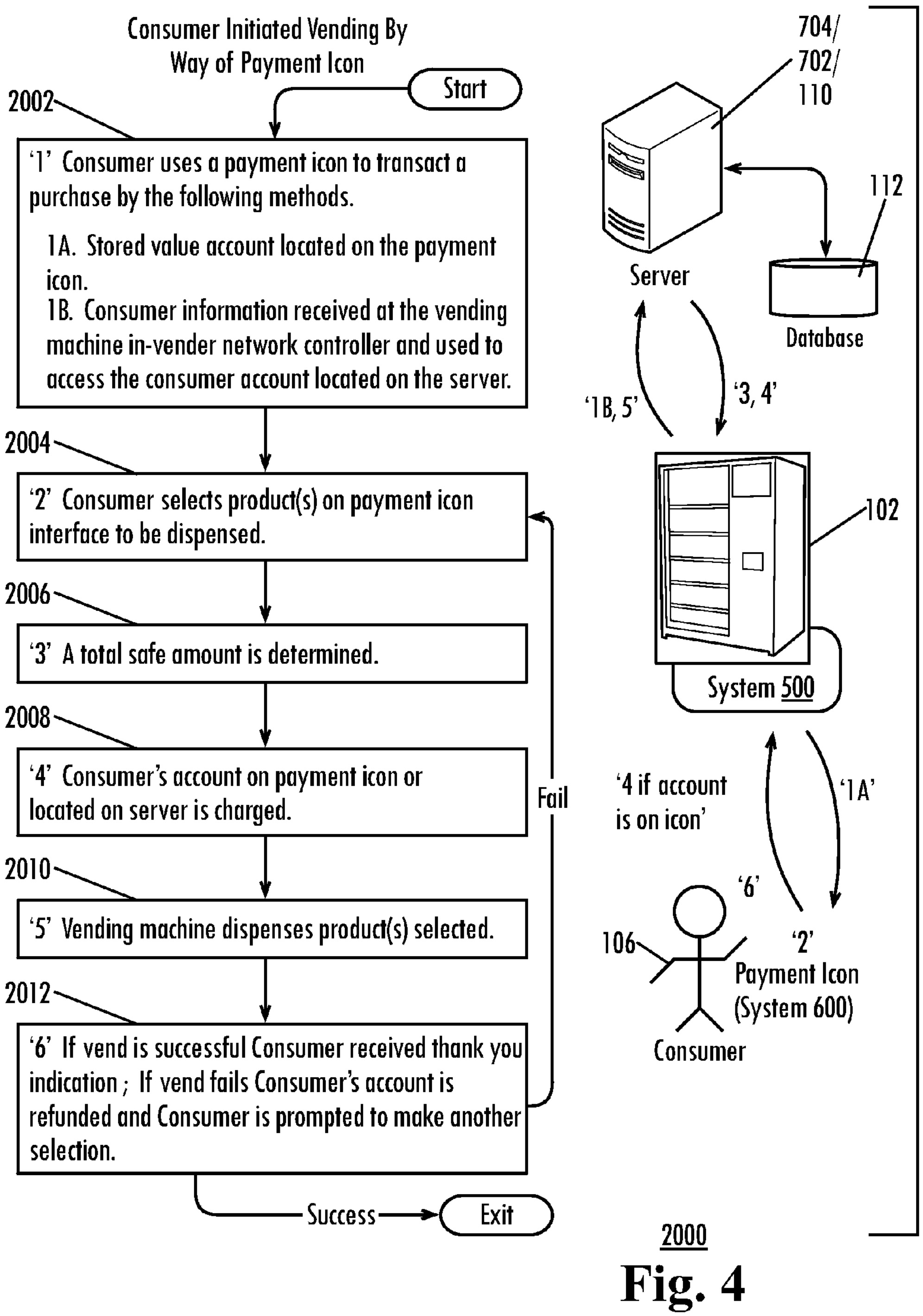
FIG. 4 illustrates one example of a method of a consumer initiated vending by way of consumer-vender transaction interaction, wherein a payment icon is utilized.

Referring to FIG. 4 there is illustrated one example of a method of consumer initiated vending by way of consumer-vender transaction interaction, wherein the payment icon 600 is utilized. The payment icon 600 may have stored account values, credit card information, payment information, or other identification necessary for the selection and dispensing of goods or services from the vending machine 102 by way of the vending bridge 500. In addition, the payment icon 600 may be in communication with other data processing devices, including the micro-switch server 702, the switch serve 704, the personal computer 110, or other data processing devices. The consumer 106 may receive information displayed by the payment icon 600, use the payment icon 600 to make product and services selections, and pay with a variety of payment options. Furthermore, the payment icon 600 may send appropriate commands to the vending bridge 500 for the dispensing of products and services from the vending machine 102.

Block 2002 illustrates data flow '1A' and '1B', shown in the figure as data communication initiated by the payment icon 600. The consumer 106 may use the payment icon 600 to transact a purchase from the vending machine 102 in a variety of ways. One such way illustrated by data flow '1A' is by using a stored value account located on the payment icon 600. In another way illustrated by data flow '1B' is by way of consumer information stored on the payment icon 600 that is used to access consumer 106 account information on the remote micro-switch server 702, the switch server 704, or other data processing device via the vending bridge 500. Data communication between the payment icon 600 and the vending bridge 500 can be by way if infrared IRDA, wireless, or other data communication method.

Block 2004 illustrates utilization of the payment icon 600 by the consumer 106. Data flow '2' shows the consumer 106 selecting products to be dispensed on the payment icon 600 consumer interface.

Block 2006 illustrates data flow '3', communication between the vending bridge 500 on the vending machine 102 and the server 704, 702, 110. Such a server may be the micro-switch server 702, the switch server 704, the personal computer 110, or other type and/or kind of server. Such a server is shown having data communication access to a database 112. The vending bridge 500 may determine a total sale amount by taking into consideration sold-out and inventory status. The vending bridge 500 also may communicate with the server to obtain the necessary information to allow a total sale amount to be determined. Such data communication between the vending bridge 500 and the server 702, 704, 110 can be by way of HTTP, HTTPS, TCP, UDP, or other types and/or kinds of data communication protocols.

Block 2008 illustrates data flow '4' between the vending bridge 500 and the server 702, 704, 110 or between the vending bridge 500 and the payment icon 600. The consumer's account on the payment icon 600 or the consumer's account located on the server 702, 704, 110 may be adjusted or otherwise charged for the selected product or services.

Block 2010 illustrates data flow '5' between the server 702, 704, 110 and the vending bridge 500. The vending bridge 500 receives data communication from the server 702, 704, 110 to dispense the selected products or service from the vending machine 102.

Block 2012 illustrates the data flow '6' between the vending bridge 500 and the payment icon 600. If the vend cycle is successful, that is the product or service was successfully vended, the consumer 106 receives a confirmation message and/or a "thank you" type message viewable on the vending machine 102 or preferably on the payment icon 600. If the vend cycle was not successful, that is the product or service did not successfully vend, then the consumer 106 account is refunded and the consumer 106 is prompted by way of the vending machine 102 or preferably the payment icon 600. On vend success the routine is exited while on vend failure the processing returns to block 2004.

Figure 5:
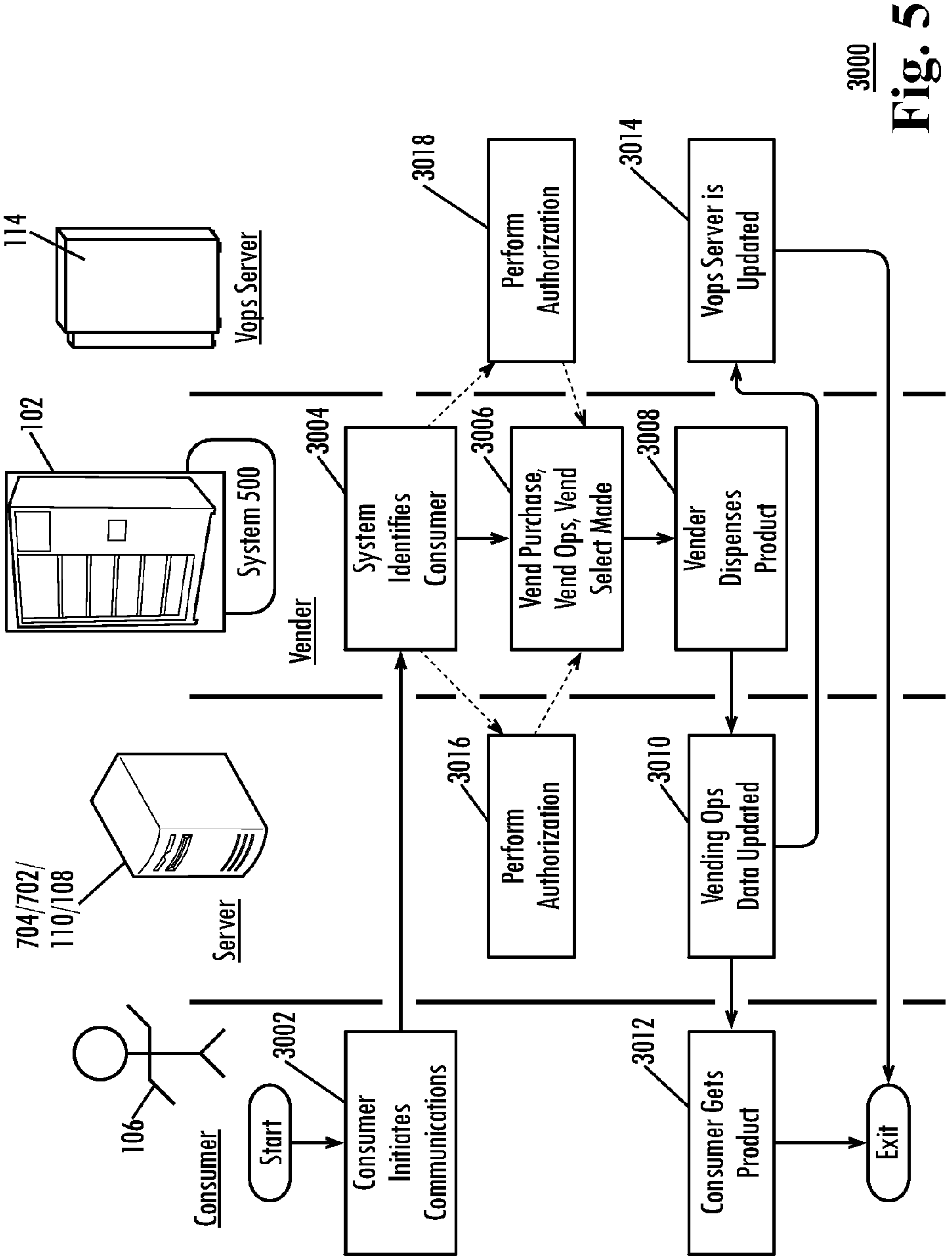
FIG. 5 illustrates one example of a method of a consumer-vender transaction, having optional transaction authorization and vending operations server update support.

Referring to FIG. 5, there is illustrated one example of a method of effectuating consumer-vender transactions, having optional transaction authorization and vending operations server update support. FIG. 5 illustrates the communication between the consumer 106, the server 704, 702, 110 or 108, the vending machine 102 and the vending bridge 500 (Vender), and a vending operations management server 114 (Vops Server).

The consumer 106 may effectuate a vending cycle without the need for the server 702, 704, 110, 108. In this configuration, the consumer 106 transacts a vending cycle with the vending bridge 500. As an optional step, authorization for the vending cycle may be obtained from the server 702, 704, 110, or 108. An advantage of this method is that the server is not required for the consumer to transact a vending cycle.

In block 3002, the consumer 106 initiates communications with the vending bridge 500 to transact a vending cycle by way of the personal data device 108 or the payment icon 600. In block 3004, the vending bridge 500 identifies the consumer 106 and communicates with the consumer's personal data device 108 or payment icon 600. Processing then moves to block 3006, block 3016, or block 3018 for authorization.

In block 3006, the vending bridge 500 allows products or services to be selected. The consumer receives information by way of the personal data device 108 or the payment icon 600 about the products or services available from the vending machine 102 by way of communication with the vending bridge 500. The consumer may select the products or services to be dispensed from the vending machine 102 by using the personal data device 108 or payment icon 600 as processed by the virtual bridge 500. In block 3008, the vending bridge 500 dispenses the selected products or services from the vending machine 102.

In block 3010, vending operations data may be communicated from the vending bridge 500 to the server 702, 704, 108, 110. Vending operations and marketing data is not stored in the vending bridge 500 but instead on the server 702, 704, 108, 110. The vending operations data does not need to be retrieved from the vending machine 102. Such retrieval may be costly, timely, unreliable, and prone to data collection problems. In block 3012, the consumer receives the selected product or service dispensed from the vending machine 102.

In block 3014, data from the server 702, 704, 110, 108 optionally may be data to a vending operations server 114. Such a vending operations server 114 may be a third party server designed to aggregate and report on vending and route operations or the data may be communicated to other types or kinds of servers. In block 3016, an authorization of consumer identification, payment, or other authorization optionally may be performed by the server 702, 704, 110, 108. In block 3018, an authorization of consumer identification, payment, or other authorization optionally may be performed by the vending operations server 114.

Figure 6:
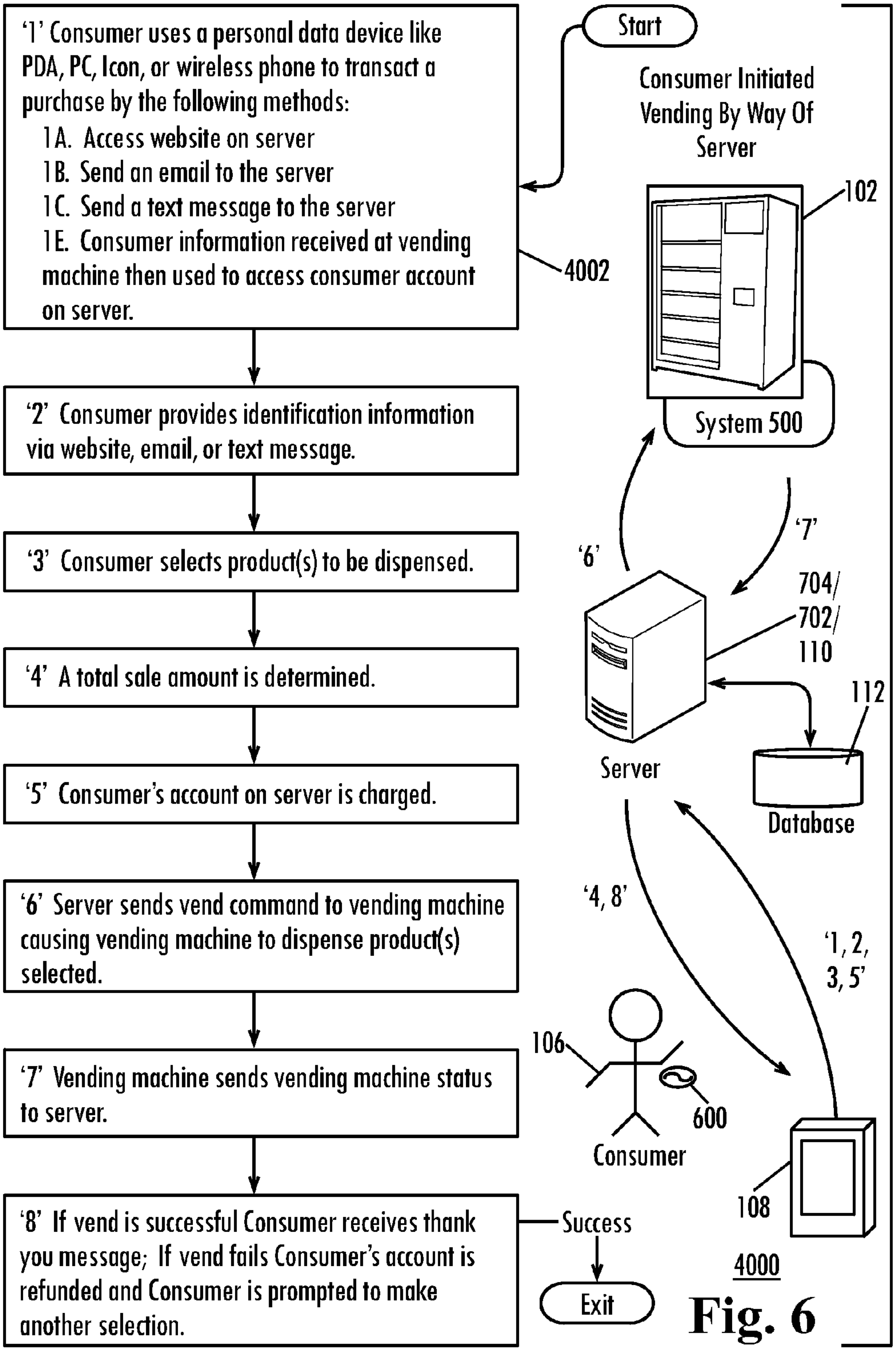
FIG. 6 illustrates one example of a method of a consumer initiated vending by way of a consumer data processing device (server)-vender transaction interaction.

Referring to FIG. 6, there is illustrated one example of a method of consumer initiated vending by way of a consumer-data processing device-vender transaction interaction. The consumer 106 may initiate a vending transaction with a server and not directly with the vending machine 102. Although the consumer 106 may be standing in front of the vending machine 102, the actual data communication and vending transaction is initiated and occurs on the server 702, 704, 110, 108. Upon a determination that a vending cycle should proceed, the server 702, 704, 110, 108 may then communicate with the vending machine 102 and command that the dispensing of products or services.

Block 4002 illustrates data flow '1', a data communication between the consumer's personal data device 108 or payment icon 600 and the server 702, 704, 110. The consumer 106 may use a PDA, a personal computer, a wireless phone, or the payment icon 600 to transact a purchase by accessing a website supported by the server 702, 704, 110, by sending an email to the server 702, 704, 110, by sending a text message to the server 702, 704, 110, by accessing stored account information on the payment icon 600 or the server 702, 704, 110, by receiving consumer information received at the vending machine 102 that may be used to access consumer account information stored on the server 702, 704, 110, or by other methods as may be desired.

Block 4004 illustrates data flow '2', a data communication between the consumer's personal data device 108 or payment icon 600 and the server 702, 704, 110. The consumer 106 may provide identification information via the website presented on the consumer's personal data device 108 or payment icon 600, or via email, or text message.

Block 4006 illustrates data flow '3', a data communication between the consumer's personal data device 108 or payment icon 600 and the server 702, 704, 110. The consumer may select the products or services to be dispensed by way of the personal data device 108 or the payment icon 600.

Block 4008 illustrates data flow '4', a data communication between the server 704, 702, 110 and the consumer's personal data device 108 or payment icon 600. A total sale amount is determined for the selected products or services to be dispensed.

Block 4010 illustrates data flow '5', a data communication between the consumer's personal data device 108 or payment icon 600 and the server 704, 702, 110. The consumer's account may be adjusted or otherwise charged for the selected products or services.

Block 4012 illustrates data flow '6', a data communication between the server 704, 702, 10O and the vending machine 102. The server 704, 702, 110 sends vend commands to the vending machine 102 so as to cause the vending machine 102 to dispense the selected products or services.

Block 4014 illustrates data flow '7', a data communication between the vending machine 102 and the server 704, 702, 110. The vending, machine 102 sends a vending machine status message to the server 704, 702, 110.

Block 4016 illustrates data flow '8', a data communication between the server 704, 702, 110 and the consumer's personal data device 108 or payment icon 600. If the vend is successful, the consumer 106 receives a confirming message and/or a "thank you" message and the routine is exited. If the vend fails, then the consumer's account is refunded, the consumer 106 is prompted to make another selection, and the processing returns to block 4006.

Figure 7:
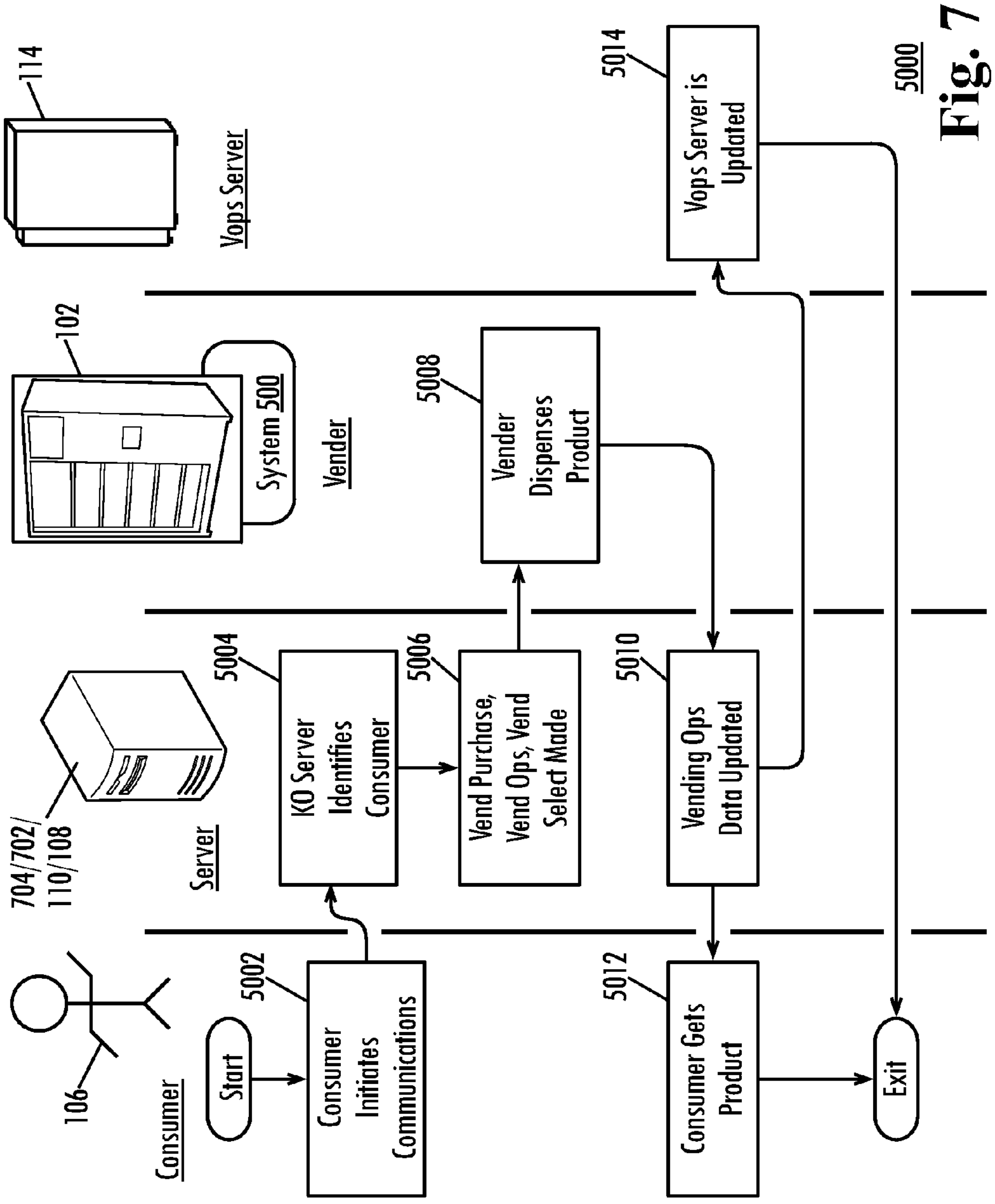
FIG. 7 illustrates one example of a method of an indirect vending transaction by way of a consumer using a data processing device, wherein the consumer's data processing device communicates with a server and the server communicates with the vending machine to effectuate the vending cycle.

Referring to FIG. 7, there is illustrated one example of a method of effectuating indirect vending transactions. A consumer 106 may use a data processing device to communicate with the server 704, 702, 110, 108 and the server 704, 702, 110, 108 communicates with the vending machine 102 to effectuate the vending cycle. FIG. 7 illustrates the data communication between the consumer 106, the server 704, 702, 110, 108, the vending machine 102 with the vending bridge 500 (Vender), and a vending operations management server 114 (Vops Server).

Thee consumer 106 may effectuate an indirect vending transaction by using a data processing device to communicate with the server 704, 702, 110, 108 instead of directly communicating with the vending machine 102. The server 704, 702, 110, 108 may communicate with the vending machine 102 and, when appropriate, cause the vending machine 102 to dispense products or services. The consumer's data processing device may include the consumer's personal data device 108 or payment icon 600.

In block 5002, the consumer 106 may initiate communications with the server 704, 702, 110, 108. Such communications may be a request to initiate a vending session with the vending machine 102. In block 5004, the server 704, 702, 110, 108 identifies the consumer. If the consumer 106 is identified and the transaction is allowed to continue, processing then moves to block 5006. In block 5006, the consumer 106 is allowed to make vend selections. In addition, vending purchase amounts and additional vending operations data may be determined.

In block 5008, the vending machine 102, by way of vending bridge 500, receives the communication from the server 704, 702, 110, 108 to dispense the selected products or services. Vending machine status and operational data related to the vending transaction, inventory, vending machine operation, and dispensed product or service status also may be communicated to the server 704, 702, 110, 108.

In block 5010, the server 704, 702, 110, 108 receives the vending operations update data from the vending machine 102. Upon a successful vend, the data communication message is sent to the consumer. In addition, vending operations data and/or other transaction data may be sent to the vending operations management server 114. In block 5012, the consumer 106 receives the dispensed product or service.

In block 5014, the vending operations management server 114 receives the vending operations data and/or other transaction data and updates as required and/or desired. The vending operations server 114 may accumulate vending operations data and/or other transaction data from a number of vending machines 102. The server 114 may then be used to report on vending activity, manage inventory and route planning, and/or provide other information as may be required and/or desired in a particular embodiment.

Figure 8:
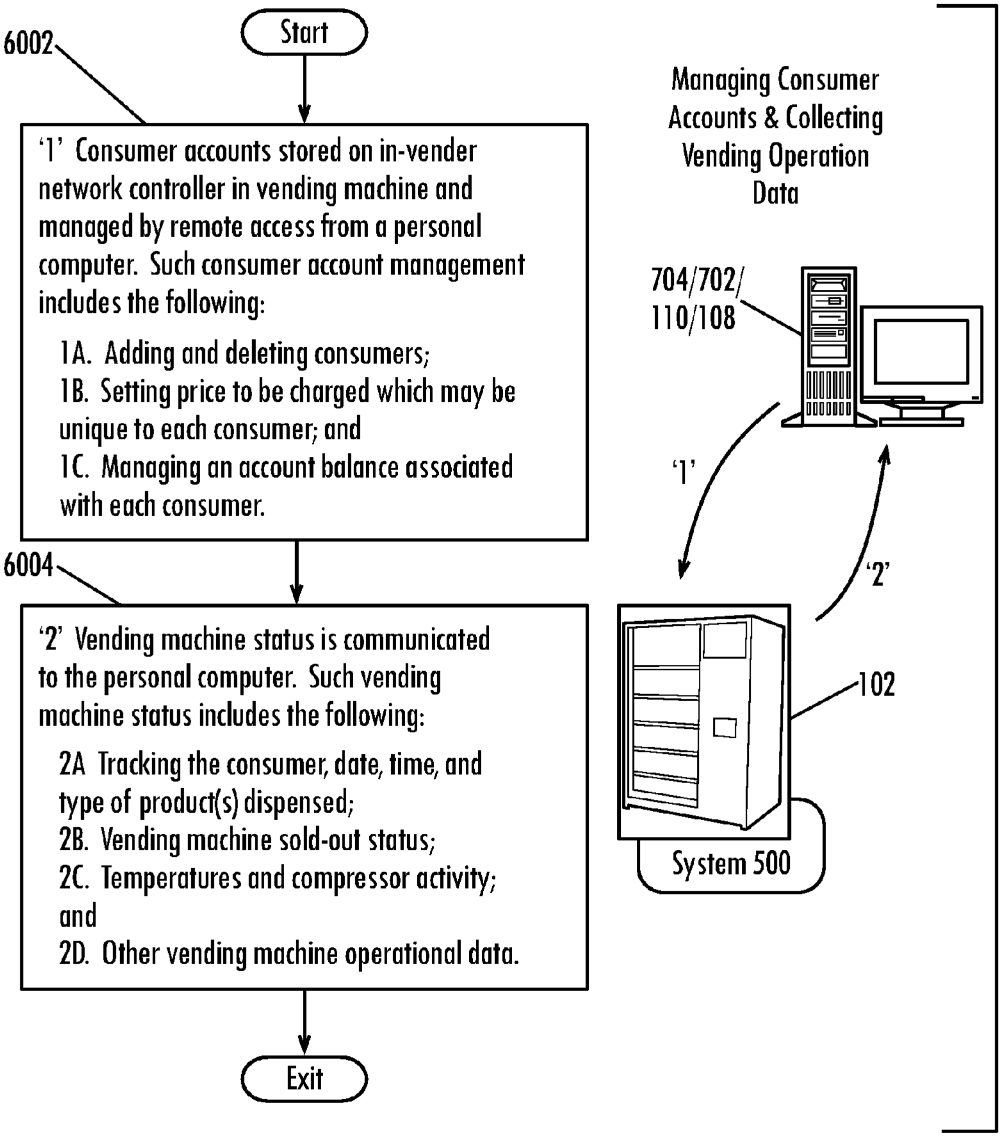
FIG. 8 illustrates one example of a method of managing consumer accounts and/or collecting vending operations data.

Referring to FIG. 8, there is illustrated one example of a method of managing consumer accounts and/or collecting vending operations data. Consumer accounts may be stored in the vending bridge 500. The consumer accounts may include the account balances, rules for vending products, and/or other information. Such information may be accessed and/or otherwise maintained by way of communications with a personal computer or the server 704, 702, 110, 108. Remote data access may be used to manage the consumer accounts stored in the vending bridge 500.

Block 6002 illustrates data flow '1', a data communication between the personal computer/server 704, 702, 110, 108 and the vending machine 102 by way of the vending bridge 500. The consumer accounts stored on the vending bridge 500 in vending machine 102 may be managed by remote access of the personal computer or server 704, 702, 110, 108. Consumer account management may include adding or deleting consumers, setting price to be charged that may be unique to each consumer or location, managing an account balance associated with each consumer, and/or other activities.

Block 6004 illustrates data flow '2', communication between the vending bridge 500 of the vending machine 102 and the personal computer or the server 704, 702, 110, 108. Status of the vending machine 102 may be communicated to the personal computer or the server 704, 702, 110, 108. Vending machine status may include tracking the consumer and the date, time, and type of product dispensed. Such vending machine status also may include vending machine sold-out status, temperatures, compressor activity, and other operational conditions.

Figure 9:
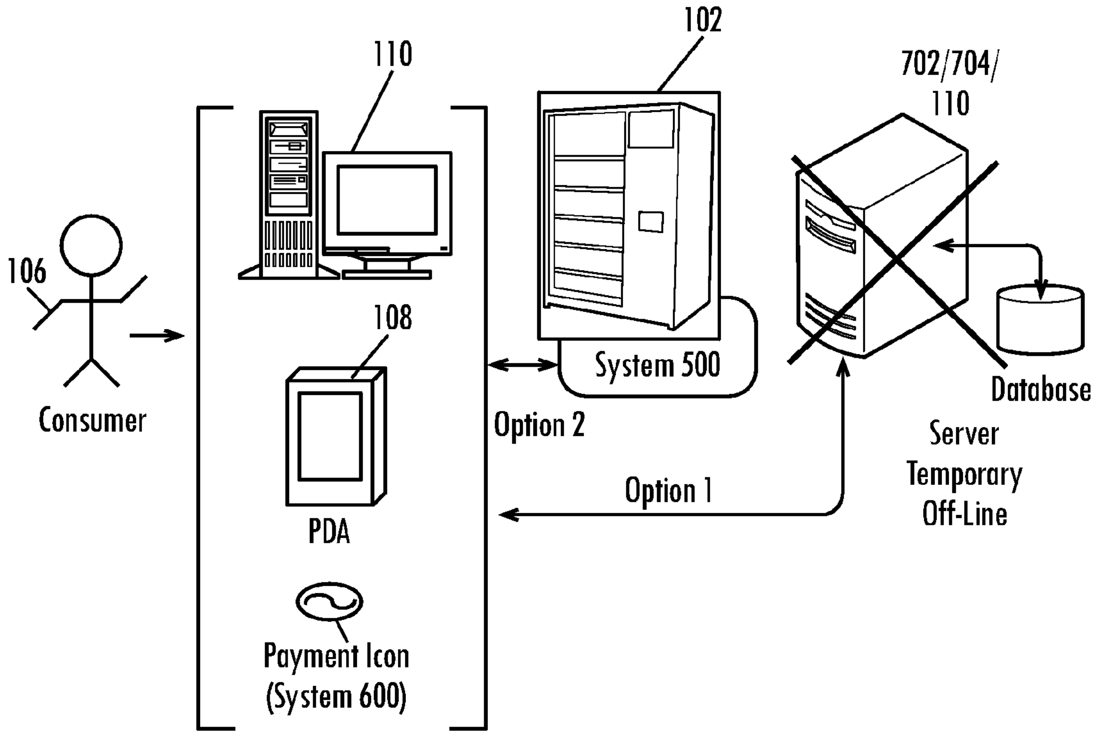
FIG. 9 illustrates one example of a vending system configured to transition between a consumer-vending machine interaction model and a consumer-server-vending machine interaction model.

Referring to FIG. 9, there is illustrated one example of a vending system configured to transition between a consumer-vending machine interaction model and a consumer-server-vending machine interaction model. A consumer-vending machine interaction model is one in which the consumer 106 communicates directly with the vending bridge 500 of the vending machine 102 to effectuate a vending cycle. As such, no server intervention is required. Alternatively, a consumer-server-vending machine interaction model is one in which the consumer 106 communicates with the server 704, 702, 110. The server 704, 702, 110 then communicates with the vending bridge 500 of the vending machine 102 to effectuate the vending cycle.

The configuration of the consumer-server-vending machine interaction model may be compromised by the server 704, 702, 110 being unavailable or going offline. If so, the system may transition to the consumer-vending machine interaction model so as to allow the consumer 106 to access the vending machine 102 directly. When the server 704, 702, 110 is made available again or brought back online, the system may transition back to a consumer-server-vending machine interaction model. Data then may be communicated and the server 704, 702, 110 may be updated with any vending operations and/or other transaction data that may have occurred while the server was unavailable or offline. As such, data integrity may be maintained as the system transitions between the consumer-vending machine interaction model and consumer-server-vending machine interaction model.

Referring to the FIG. 9, the consumer 106 may utilize a number of data processing devices such as the personal computer 110, the personal data device 108, or the payment icon 600 to initiate a vending cycle with the vending machine 102. In an 'Option 1', the data processing device data may communicate with the server 704, 702, 110. The server then may communicate with the vending machine vending bridge 500 to effectuate the vending cycle. This option may be referred to as the consumer-server-vending machine interaction model. In an 'Option 2', the data processing device data may communicate with the vending bridge 500 of the vending machine 102 to effectuate the vending cycle. This option may be referred to as the consumer-vending machine interaction model.

The system may be transitioned between the consumer-vending machine interaction model and the consumer-server-vending machine interaction model. Such transitioning may be selected on demand or utilized in a fail over configuration. In such a fail over configuration as indicated in 'Option 1', the consumer-server-vending machine interaction model is rendered inoperative by the server 704, 702, 110 being unavailable or offline. The system then may automatically utilize 'Option 2', the consumer-vending machine interaction model. In this regard, vending from the vending machine 102 may continue even when the server 704, 702, 110 is unavailable or offline.

Figure 10:
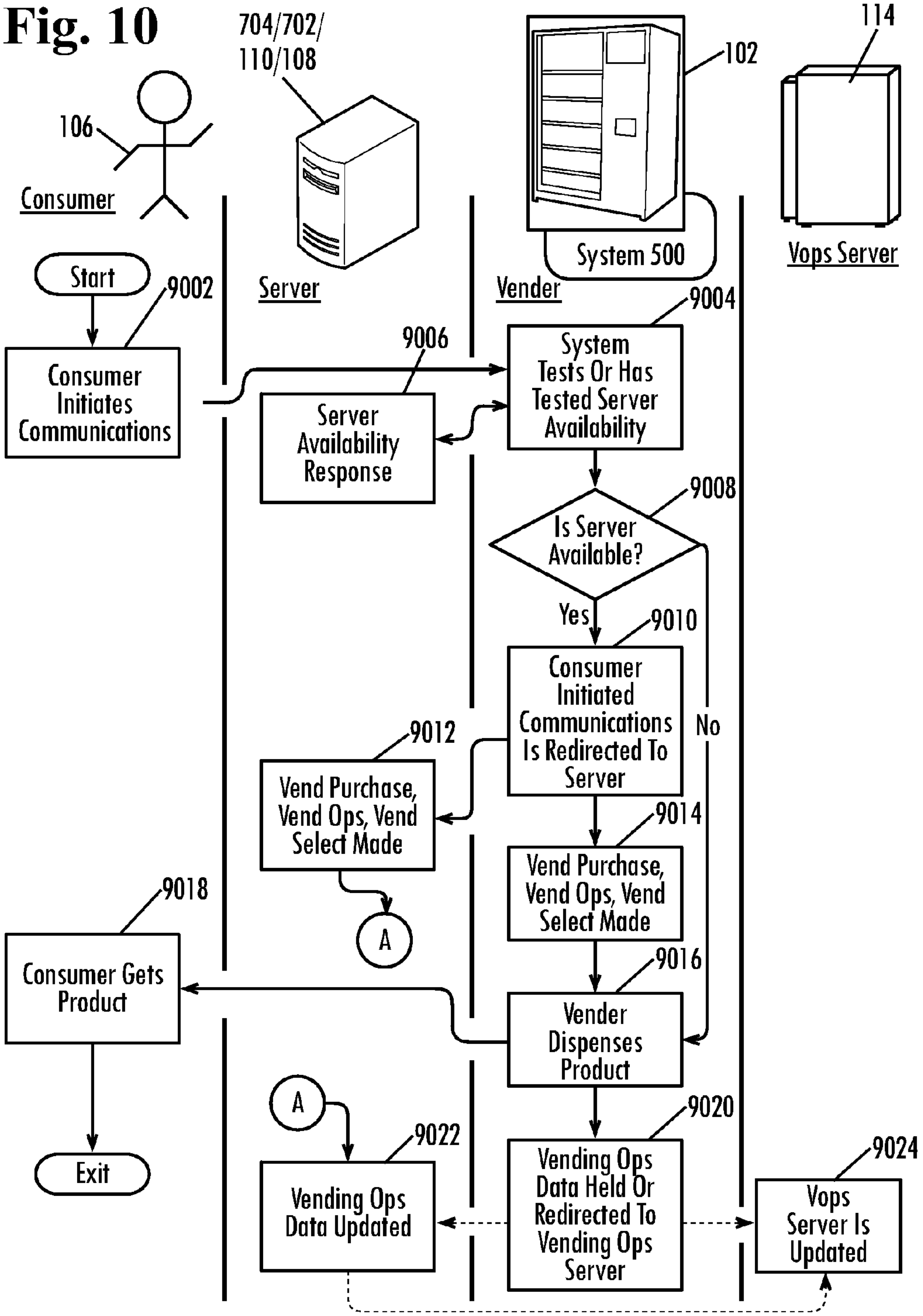
FIG. 10 illustrates one example of a method of transitioning between a consumer-vender interaction model and a consumer-server-vender interactions model.

Referring to FIG. 10, there is illustrated one example of a method of transitioning between a consumer-vender interaction model and a consumer-server-vender interactions model. FIG. 10 illustrates communications between the consumer 106, the server 704, 702, 110, 108, the vending bridge 500 of the vending machine 102 (Vender), and the vending operations management server 114 (Vops Server).

The system may transition between consumer-vending machine interaction model and the consumer-server-vending machine interaction model. If the consumer-server-vending machine interaction model is compromised by the server 704, 702, 110 being unavailable or going offline, the system may transition to the consumer-vending machine interaction model so as to allow the consumer to access the vending machine 102 directly. Such a transition allows vending cycles to be completed by the consumer 106 when the server 704, 702, 110 is unavailable or offline.

In block 9002, the consumer 106 initiates a vending cycle by communicating with the vending bridge 500 of the vending machine 102. In block 9004, the vending bridge 500 communicates with the server 704, 702, 110, 108 to determine the availability of the server. If no response is received from the server 704, 702, 110, 108 or the server sends a response indicating it is not available, then processing moves to block 9006 to test the availability of the server and then to decision block 9008. In block 9006, if the server 704, 702, 110, 108 is available, a response is returned indicating such availability. In decision block 9008, a determination is made as to whether the server is available. If the resultant is in the affirmative, then processing moves to block 9010. If the resultant is in the negative then processing moves to block 9014.

In block 9010, the consumer initiated communication is redirected from the vending bridge 500 to the server 704, 702, 110, 108 for further data processing. In block 9012, the consumer 106 is allowed by way of the server 704, 702, 110, 108 to make vend selections. In addition, vending purchase amounts and additional vending operations data are determined. In block 9014, the consumer 106 is allowed by way of the vending bridge 500 to make vend selections. In addition, vending purchase amounts and additional vending operations data are determined. In block 9016, the vending machine 102 dispenses the selected products or services. Vending machine status and operational data related to the vending transaction, inventory, vending machine operation, and dispensed product or service status may be determined and prepared for processing. In block 9018, the consumer 106 receives the dispensed product or service.

In block 9020, vending machine status and operational data related to the vending transaction, inventory, vending machine operation, and dispensed product or service status are held for future data processing when the server is available and/or redirected to vending operation management server 114. In block 9022, vending machine status and operational data related to the vending transaction, inventory, vending machine operation, and dispensed product or service status is updated by server 704, 702, 110, 108. In block 9024, the vending operations management server 114 receives the vending operations data and/or other transaction data and updates. The vending operations server 114 accumulates vending operations data and/or other transaction data from a number of vending machines 102. Such a server 114 then may be used to report on activity, manage inventory and route planning, and/or provide other information.

Figure 11:
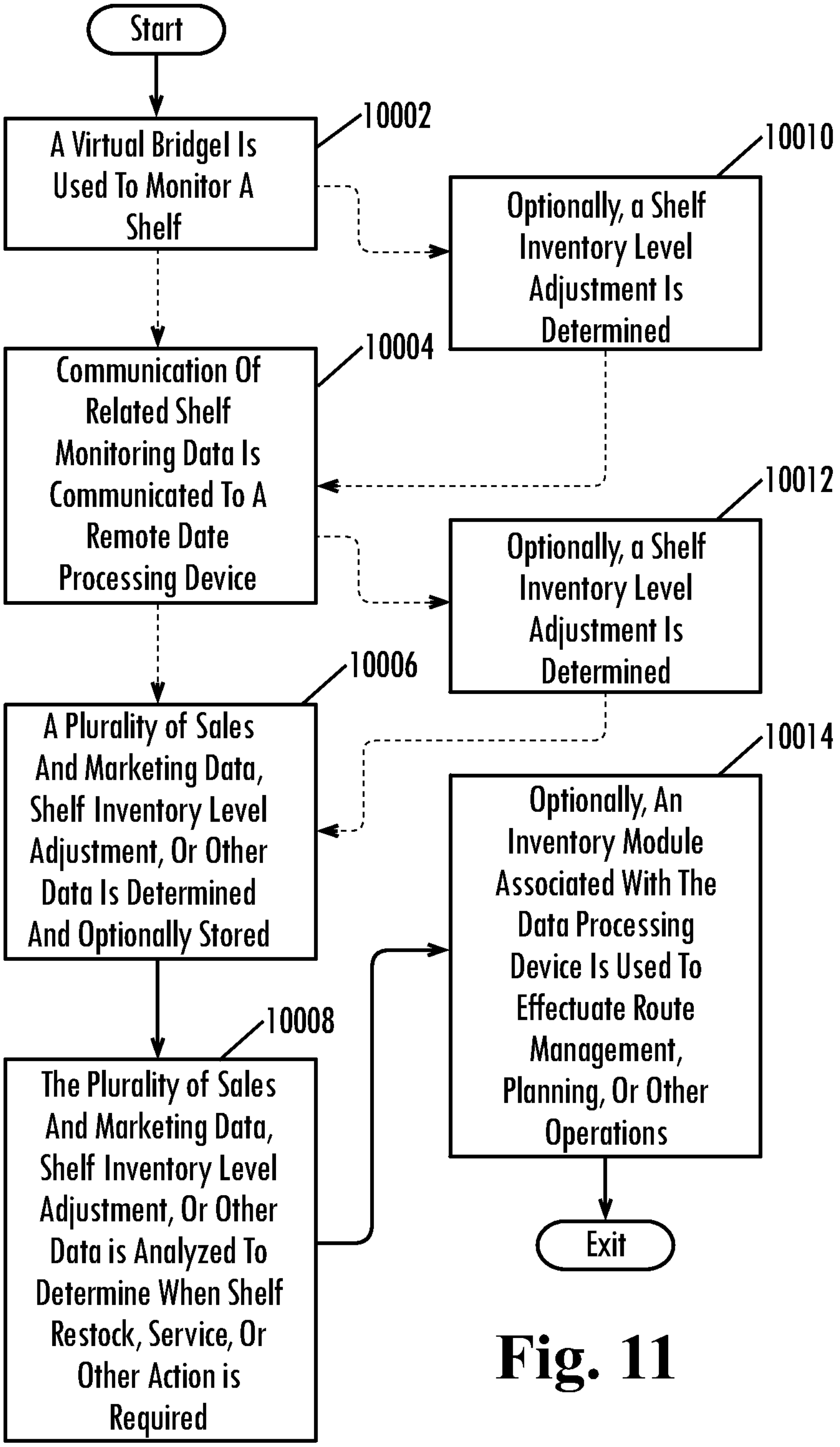
FIG. 11 illustrates one example of a method of tracking shelf inventory.

Referring to FIG. 11, one example of a method of tracking shelf inventory is shown. The vending bridge 500 may be utilized to monitor a shelf. Such a shelf may be a shelf in a cooler 102B (shown in FIG. 1C) or any type of shelf. The shelf may be monitored by way of shelf monitor. Such a shelf monitor may include a shelf inventory sense 526, an inventory imaging interface 534, a GPIO (General Purpose Input/Output) 538, a goods or services dispense sensor 518, or other methods, sensors, and/or interfaces.

The vending bridge 500 may monitor one or more of the shelves. A shelf inventory level adjustment may be determined from this monitoring information. The shelf inventory level adjustment includes the determined change in the inventory level on the shelf. For example, the shelf inventory level adjustment determines an increase in inventory when products are added to a cooler shelf and determines a decrease in inventory when a consumer removes products. As such, the shelf inventory level adjustment may be used in part to manage an inventory level on a shelf. The shelf inventory level adjustment may be determined and then communicated to a remote data processing resource or device such as the server 108, 110, 702, 704. Alternatively, the vending bridge 500 may communicate with a remote data processing resource and the shelf inventory level adjustment may be determined at the remote data processing resource or device.

In addition to the shelf inventory level adjustment data, sales and marketing data, and other types of data optionally may be stored. The data then may be analyzed and used in part to determine when shelf restocking, service, or other action may be required. Optionally, an inventory module, such as the inventory module associated with route operations 706 or other type of module may be used for route management, planning, or other types of operations.

Monitoring the shelves of a cooler not only may be used to manage inventory but the collected data also may be used to form an inventory management file or a DEX file (Data Exchange File) so as to allow coolers to be managed in the same manner as vending machines. A DEX file is an industry standard in the vending industry and is supported by and detailed in the European Vending Association (EVA) DEX specifications. Traditional inventory management software used in the vending industry and other types of software capable of reading DEX files and other types of inventory management files may be used to manage the coolers and the venders. This management provides the ability to plan and monitor routes and operations.

In block 10002, the vending bridge 500 may be used to monitor a shelf. Such a shelf may be associated with a cooler, other types of immediate consumption equipment, or other types of shelves. In addition, monitoring may be of one shelf or of a number of shelves. Processing then moves to either block 10004 or block 10010. In block 10004, shelf monitoring data is communicated to a remote data processing device. Processing then moves to either block 10006 or block 10012.

In block 10006, sales and marketing data, shelf inventory level adjustment data, or other data is determined and optionally stored. The sales and marketing data may be generated each time a consumer removes inventory from a shelf or at other intervals. As such, sales and marketing data and patterns may be used to monitor inventory, determine day part sales, plan restocking, service, route operations, or functionality. In block 10008, the sales and marketing data, shelf inventory level adjustment data, or other data may be analyzed to determine in part when shelf restock, service, or other action is required. In block 10014, an inventory module associated with the remote data processing device optionally may be used for route management, planning, or other operations. For example, the route operation module 706 may be utilized.

Alternatively in block 10010, shelf inventory level adjustment data or other data optionally may be determined. Processing then moves to block 10004. In block 10012, shelf inventory level adjustment data or other data optionally may be determined. Processing then moves to block 10006.

Inventory management thus may be performed with respect to coolers and vending machine as well as other types and/or kinds of immediate consumption equipment. Data from coolers and vending machines may be processed by route management software and reported accordingly. Coolers and vending machines thus may have inventory managed from a single data processing resource and/or software that has traditionally been developed to manage only vending machine inventory. Shelf inventory monitoring may be used in immediate consumption equipment that generally does not have an inventory control system built in to generate, communicate, and otherwise monitor shelf inventory.

Figure 12:
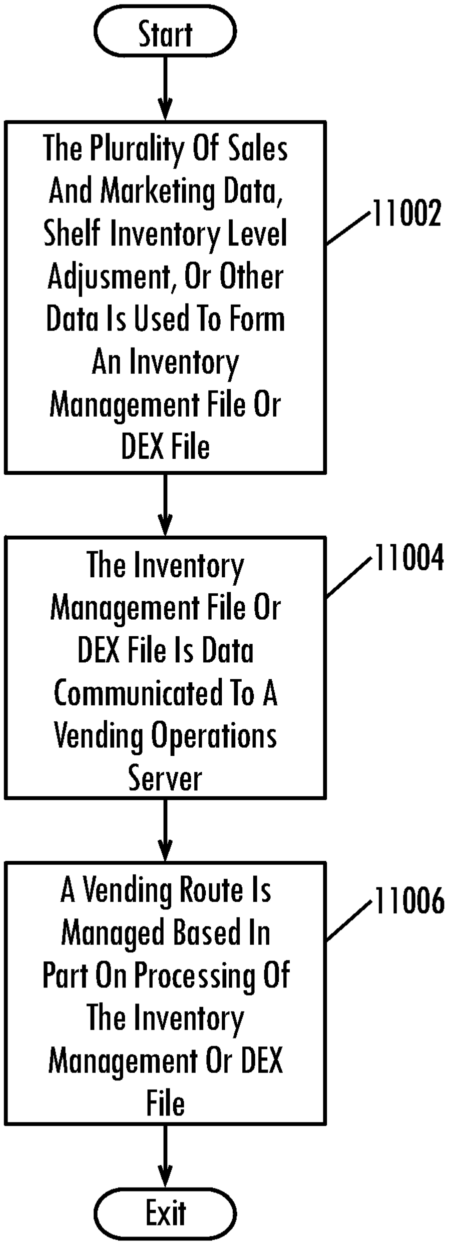
FIG. 12 illustrates one example of forming inventory management files to track shelf inventory.

Referring to FIG. 12, one example of forming inventory management files or DEX files to track shelf inventory is shown. The sales and marketing data, shelf inventory level adjustment data, or other data captured in FIG. 11 may be used to form an inventory management file or a DEX file. Such an inventory management file or DEX file may be communicated to the vending operation server 114 or otherwise wherein route management, sales, reporting, equipment statuses, inventory, and other planning and operations may be provided. Forming and communicating a DEX file based on shelf monitoring by the vending bridge 500 thus allows coolers and non-vending machines to have inventory and route planning activities coordinated as is commonly done with vending machines. As such, both shelf based equipment and vending machine type equipment may be managed by way of industry standard DEX files.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments of the application have been described, it will be understood that those skilled in the art, both now and in the future, may make various improvements and enhancements that fall within the scope of the claims that follow. These claims should be construed to maintain the proper protection for the invention first described.

We claim:

1. A vending machine system for dispensing goods or services, comprising:

a vending machine without an onboard vending machine controller, the vending machine comprising a vending mechanism; and a vending bridge in communication with the vending mechanism and a virtual vending machine controller resident on a data processing device remote from the vending machine, the virtual vending machine controller adapted to reconcile a product selection to a product location on the vending machine;

the vending bridge adapted to receive a command from the virtual vending machine controller to dispense the selected product from the product location via the vending mechanism.

2. The vending machine of claim 1, wherein the vending bridge comprises a consumer interface, a lighting control interface, a display interface, or a motor control interface.

3. The vending machine of claim 1, wherein the data processing device comprises a server, a personal computer, a payment icon, or a telephone.

4. The vending machine of claim 1, wherein the data processing device comprises a microprocessor readable medium having embodied thereon instructions that when executed perform: dispensing at least one of the goods or services from the vending machine, receiving consumer payment information, and charging for the goods or services.

5. The vending machine of claim 1, wherein the data processing device comprises a microprocessor readable medium having embodied thereon instructions that when executed perform: managing a night time mode of operation of the vending machine.

6. The vending machine system of claim 1, wherein the data processing device comprises a microprocessor readable medium having embodied thereon instructions that when executed perform: receiving a communication from a consumer, determining if dispensing the goods or services is approved, and dispensing of the goods or services.

7. The vending machine system of claim 1, wherein in the data processing device comprises a vending operations server.

8. The vending machine system of claim 7, wherein the vending bridge comprises a microprocessor readable medium having embodied thereon instructions that when executed perform: storing a plurality of vending operations data when a vending operations server is off-line and communicating the plurality of vending operations data to the vending operation server when the vending operations server is on-line.

9. The vending machine system of claim 1, wherein the vending bridge comprises a microprocessor readable medium having embodied thereon instructions that when executed perform: managing energy usage and efficiency of the vending machine.

10. The vending machine system of claim 1, wherein the data processing device comprises a plurality of virtual equipment modules.

11. The vending machine system of claim 1, further comprising a payment services system in communication with the data process device.

12. The vending machine system of claim 1, further comprising a consumer interaction system in communication with the data process device.

13. The vending machine system of claim 1, further comprising a route operations system in communication with the data process device.

14. The vending machine system of claim 1, further comprising an accounting services system in communication with the data process device.

15. The vending machine system of claim 1, wherein the vending machine comprises a fountain dispenser.

16. The vending machine system of claim 1, wherein the vending machine comprises a cooler.

17. The vending machine of claim 1, wherein the vending bridge is further adapted to receive the product selection and communicate the product selection to the virtual vending machine controller.

18. The vending machine of claim 17, wherein the vending bridge receives the product selection from a user interface on the vending machine or a personal data device in communication with the vending bridge.

19. The vending machine of claim 1, wherein the vending bridge is connected to a multi-drop-bus of the vending machine.

20. The vending machine of claim 1, wherein the virtual vending machine controller is further adapted to account for consumer payment of the selected product, determine a sold out status of the selected product, or manage space to sales dispensing of products from the vending machine.

21. The vending machine of claim 1, wherein the vending bridge comprises a motor driver configured to drive the vending mechanism.

22. The vending machine of claim 21, wherein the motor driver dispenses the selected product by way of network control.

23. The vending machine system of claim 1, wherein the vending machine comprises a refrigeration system and wherein the data processing device controls the refrigeration system via the vending bridge.

24. The vending machine of claim 23, wherein the vending bridge comprises a refrigeration control interface in communication with the refrigeration system and the data processing device.

25. The vending machine system of claim 24, wherein the refrigeration control interface comprises a compressor control interface.

26. The vending machine system of claim 24, wherein the refrigeration control interface comprises one or more temperature sensors.

27. The vending machine system of claim 24, wherein the refrigeration control interface comprises one or more fan control interfaces.

28. The vending machine system of claim 24, wherein the refrigeration control interface comprises a remote motion detector.

29. A vending machine system for dispensing goods or services, comprising:

a vending machine without an onboard vending machine controller, the vending machine comprising a vending mechanism; and a vending bridge in communication with the vending mechanism and a virtual vending machine controller resident on a data processing device remote from the vending machine, the virtual vending machine controller adapted to reconcile a product selection location on the vending machine;

the vending bridge in communication with the data processing device and the vending mechanism of the vending machine such that the data processing device may receive consumer payment information and the vending bridge is configured to receive a command from the virtual vending machine controller to dispense the selected product from the product location via the vending mechanism.

30. A vending machine system, comprising:

a vending machine without an onboard vending machine controller, the vending machine comprising a vending mechanism; and a vending bridge in communication with the vending mechanism and a virtual vending machine controller resident on a data processing device remote from the vending machine, the virtual vending machine controller adapted to reconcile a product selection to a product location on the vending machine;

the vending bridge in communication with a plurality of virtual equipment modules of the data processing device and adapted to receive a command from the virtual vending machine controller to dispense the selected product from the product location via the vending mechanism.

31. A vending machine system for dispensing goods or services, comprising:

a vending machine without an onboard vending machine controller, the vending machine comprising a refrigeration system and a vending mechanism;

a data processing device remote from the vending machine; and a vending bridge;

the data processing device controls the refrigeration system via the vending bridge, wherein the data processing device comprises a microprocessor readable medium having embodied thereon instructions that when executed cause the data processing device to:

receive humidity data, determine if condensation will form on surfaces of the vending machine, and control the refrigeration system to prevent the formation of condensation, and the vending bridge in communication with the data processing device and the vending mechanism of the vending machine such that the data processing device directly instructs the vending mechanism to dispense the goods or the services in a master-slave relationship in response to a selection of goods or services.

* * * * *